United States Patent
Pattan et al.

(10) Patent No.: US 11,611,593 B2
(45) Date of Patent: Mar. 21, 2023

(54) SYSTEM AND METHOD FOR ESTABLISHING FIRST-TO-ANSWER CALL IN MISSION CRITICAL PUSH TO TALK COMMUNICATION

(71) Applicant: Samsung Electronics Co., Ltd., Suwon-si (KR)

(72) Inventors: Basavaraj Jayawant Pattan, Bangalore (IN); Suresh Chitturi, Bangalore (IN); Nishant Gupta, Sitapur (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/720,659

(22) Filed: Apr. 14, 2022

(65) Prior Publication Data
US 2022/0239706 A1    Jul. 28, 2022

Related U.S. Application Data

(63) Continuation of application No. 16/317,466, filed as application No. PCT/KR2017/007596 on Jul. 14, 2017, now Pat. No. 11,310,290.

(30) Foreign Application Priority Data

Jul. 15, 2016    (IN) .............................. 201641024347
Apr. 5, 2017    (IN) .............................. 201641024347

(51) Int. Cl.
*H04L 65/1069*    (2022.01)
*H04W 12/06*    (2021.01)
(Continued)

(52) U.S. Cl.
CPC ........... *H04L 65/1069* (2013.01); *H04W 4/10* (2013.01); *H04W 12/06* (2013.01); *H04W 12/08* (2013.01); *H04W 76/10* (2018.02); *H04W 76/45* (2018.02)

(58) Field of Classification Search
CPC ............. H04L 65/1069; H04L 65/4061; H04L 65/4038; H04W 4/10; H04W 76/45;
(Continued)

(56) References Cited

U.S. PATENT DOCUMENTS 6,363,258 B1    3/2002    Schmidt et al.
6,442,396 B1    8/2002    Schmidt et al.
(Continued)

FOREIGN PATENT DOCUMENTS

CN    101138201 A    3/2008
CN    101384018 A    3/2009
(Continued)

OTHER PUBLICATIONS

US Department of Commerce (SA1 MCPTT-R Rapporteur), "CRTS 22.179 V14.0.0 (Mar. 2016) Mission Critical Push to Talk over LTE for Realignment (MCPTT-R)" 3GPP TSG-SA WG1 Meeting #74, May 9-13, 2016, 58 pages, S1-161626.
(Continued)

*Primary Examiner* — Keith Ferguson

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments herein provide a system for establishing a first-to-answer call in a Mission Critical Push to Talk (MCPTT) communication. The system includes a MCPTT originating client configured to initiate a first-to-answer call and transmit a first-to-answer call request to a
(Continued)

MCPTT server. The system includes the MCPTT server configured to receive the first-to-answer call request from the MCPTT client.

20 Claims, 17 Drawing Sheets

(51) Int. Cl.
  *H04W 12/08* (2021.01)
  *H04W 76/45* (2018.01)
  *H04W 76/10* (2018.01)
  *H04W 4/10* (2009.01)

(58) Field of Classification Search
  CPC ......... H04W 4/90; H04W 76/50; H04W 4/08; H04W 12/06; H04W 12/08
  See application file for complete search history.

(56) References Cited

U.S. PATENT DOCUMENTS

| | | | |
|---|---|---|---|
| 7,623,883 B2 | 11/2009 | Park et al. | |
| 8,358,999 B1* | 1/2013 | Vu | H04W 4/16 455/500 |
| 2014/0349699 A1 | 11/2014 | Fish et al. | |
| 2016/0212683 A1 | 7/2016 | Freeman | |
| 2017/0289776 A1 | 10/2017 | Kim et al. | |

FOREIGN PATENT DOCUMENTS

| | | |
|---|---|---|
| KR | 10-2016-0002150 A | 1/2016 |
| WO | 01/37604 A1 | 5/2001 |
| WO | 2006/096013 A1 | 9/2006 |
| WO | 2016/039579 A1 | 3/2016 |
| WO | 2016/111528 A | 7/2016 |

OTHER PUBLICATIONS

"3rd Generation Partnership Project; Technical Specification Group Core Networks and Terminals; Mission Critical Push to Talk (MCPTT) call control; Protocol specification (Release 13)", 3GPP TS 24.379 v13.1.1 (Jun. 2016), 403 pages.

International Search Report dated Oct. 24, 2017 in connection with International Patent Application No. PCT/KR2017/007596, 3 pages.

Written Opinion of the International Searching Authority dated Oct. 24, 2017 in connection with International Patent Application No. PCT/KR2017/007596, 8 pages.

"3rd Generation Partnership Project; Technical Specification Group Services and System Aspects; Mission Critical Push to Talk (MCPTT) over LTE; Stage 1 (Release 14)", 3GPP TS 22.179 V14.1.0 (Jun. 2016), 83 pages.

Supplementary European Search Report dated Apr. 3, 2019 in connection with European Patent Application No. 17 82 8004, 10 pages.

Office Action dated Jan. 4, 2021 in connection with Chinese Patent Application No. 201780043551.8, 14 pages.

European Patent Office, "Communication pursuant to Article 94(3) EPC" dated Mar. 26, 2021, in connection with European Patent Application No. 17828004.6, 7 pages.

3rd Generation Partnership Project, Technical Specification Group Core Networks and Terminals, Mission Critical Push to Talk (MCPTT) call control, Protocol specification (Release 13), 3GPP TS 24.379 V0.3.0, Oct. 2015, 289 pages.

* cited by examiner

SYSTEM AND METHOD FOR ESTABLISHING FIRST-TO-ANSWER CALL IN MISSION CRITICAL PUSH TO TALK COMMUNICATION

CROSS-REFERENCE TO RELATED APPLICATIONS

This application is a continuation of U.S. patent application Ser. No. 16/317,466 filed on Jan. 11, 2019, which is a 371 of International Application No. PCT/KR2017/007596 filed on Jul. 14, 2017, which claims priority to India Patent Application No. 201641024347 filed on Apr. 5, 2017, and India Patent Application No. 201641024347 filed on Jul. 15, 2016, the disclosures of which are herein incorporated by reference in their entirety.

BACKGROUND

1. Field

The embodiments herein generally relate to mission critical push to talk (MCPTT) communication systems. More particularly related to a system and method for establishing a first-to-answer call in a MCPTT communication.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A Push To Talk service provides an arbitrated method by which two or more users may engage in communication. The users may request permission to transmit information (e.g., traditionally by means of a press of a button). The MCPTT over Long Term Evolution (LTE) service supports an enhanced Push-to-talk (PTT) service, suitable for mission critical scenarios, based on 3GPP Evolved Packet System (EPS) services.

The MCPTT service is intended to support communication between several users (i.e., a group call), where each user has the ability to gain access to the permission to talk in an arbitrated manner. However, the MCPTT service also supports private calls between pair of users. The MCPTT service builds on the existing 3GPP transport communication mechanisms provided by the EPS architectures to establish, maintain, and terminate the actual communication path(s) among the users.

A private call is a call between a pair of MCPTT users using the MCPTT service with or without a MCPTT floor control. The private call is initiated with a certain commencement mode, which is a setting that determines the conditions under which the call is initiated. The commencement mode can be automatic or manual. The private call in which the initiation of the private call does not require any action on the part of the receiving MCPTT user is automatic commencement mode. On the contrary, manual commencement mode is the private call in which the initiation of the private call requires the receiving MCPTT user to perform some action to accept or reject the private call setup.

SUMMARY

There is a need for establishing a first-to-answer call between users in a mission critical push to talk (MCPTT) communication.

First-to-answer call is defined as a call that is started when the first MCPTT user among multiple potential target recipients answers. This call requires the answering MCPTT user to answer manually; automatic answer is not allowed.

Call handling preferences such as voice mail redirection, automatic reply, commencement modes etc., are ignored by the MCPTT recipient client and the user is alerted of the incoming first-to-answer call request.

Accordingly, the embodiments herein provide a system for establishing a first-to-answer call in a MCPTT communication. The system includes a MCPTT originating client configured to initiate a first-to-answer call and send a first-to-answer call request to a MCPTT server. Further, the system includes the MCPTT server configured to receive the first-to-answer call request from the MCPTT originating client. Further, the MCPTT server is configured to send the first-to-answer call request to a plurality of MCPTT recipient clients and receive a first-to-answer call response from one or more candidate MCPTT recipient clients among the plurality of MCPTT recipient clients. Further, the MCPTT server is configured to send the first-to-answer call response to the MCPTT originating client. Further, the MCPTT originating client is further configured to receive the first-to-answer call response from the MCPTT server and establish a media plane with the one or more candidate MCPTT recipient clients through the MCPTT server.

The candidate MCPTT recipient client is the recipient client which responded first among all other MCPTT recipient clients. In an embodiment, one or more candidate MCPTT recipient clients among many MCPTT recipient clients first responds to the call request received from the MCPTT server.

Accordingly, the embodiment herein is to provide a method for managing a first-to-answer call in a MCPTT communication. The method includes receiving, by a MCPTT originating client, a first-to-answer call response corresponding to one or more candidate MCPTT recipient clients among a plurality of MCPTT recipient clients from a MCPTT server. Further, the method includes establishing, by the MCPTT originating client, a media plane with the one or more candidate MCPTT recipient clients through the MCPTT server.

In an embodiment, receiving the first-to-answer call response corresponding to the one or more candidate MCPTT recipient clients include sending a first-to-answer call request to the MCPTT server and receiving the first-to-answer call response corresponding to the one or more candidate MCPTT recipient clients among the plurality of MCPTT recipient clients from the MCPTT server.

In an embodiment, receiving the first-to-answer call response corresponding to the one or more candidate MCPTT recipient clients include sending a first-to-answer call request to each of the MCPTT recipient client in the plurality of MCPTT recipient clients through the MCPTT server and receiving the first-to-answer call response corresponding to the one or more candidate MCPTT recipient clients among the plurality of MCPTT recipient clients from the MCPTT server.

In an embodiment, sending the first-to-answer call request to the MCPTT server includes receiving a first-to-answer query response from the plurality of MCPTT recipient clients, determining the one or more candidate MCPTT recipient clients from the plurality of MCPTT recipient clients in response to receiving the first-to-answer query response, and sending the first-to-answer call request corresponding to the one or more candidate MCPTT recipient clients to the MCPTT server.

In an embodiment, the first-to-answer call request includes but not limited to a Group Identifier, the plurality of MCPTT recipient clients, a resource list, a Uniform Resource Identifier (URI), and a Group URI.

In an embodiment, the method further includes sending a first-to-answer call cancel request to at least one non-candidate MCPTT recipient client among the plurality of MCPTT recipient clients through the MCPTT server.

In an embodiment, the method further includes sending the first-to-answer call cancel request after receiving a first-to-answer call response from the at least one non-candidate MCPTT recipient client among the plurality of MCPTT recipient clients.

Accordingly, the embodiment herein is to provide a method for managing a first-to-answer call in a MCPTT communication. The method includes sending, by a MCPTT originating client, a first-to-answer call back request to a MCPTT server. Further, the method includes receiving, by the MCPTT originating client, a first-to-answer call request corresponding to one or more candidate MCPTT recipient clients among a plurality of MCPTT recipient clients from the MCPTT server. Further, the method includes sending, by the MCPTT originating client, a first-to-answer call response to the MCPTT server. Further, the method includes establishing, by the MCPTT originating client, a media plane with the one or more candidate MCPTT recipient clients through the MCPTT server.

In an embodiment, the method further includes receiving, by the MCPTT originating client, a first-to-answer call request corresponding to at least one non-candidate MCPTT recipient client among the plurality of MCPTT recipient clients from the MCPTT server. Further, the method includes sending, by the MCPTT originating client, a first-to-answer call reject message corresponding to the at least one non-candidate MCPTT recipient client to the MCPTT server.

In an embodiment, the first-to-answer call back request includes but not limited to Group Identifier, the plurality of MCPTT recipient clients, a resource list, a URI, and a Group URI.

Accordingly, the embodiment herein is to provide a method for managing a first-to-answer call in a MCPTT communication. The method includes receiving, by a MCPTT server, a first-to-answer call request from a MCPTT originating client. Further, the method includes sending, by the MCPTT server, the first-to-answer call request to a plurality of MCPTT recipient clients. Further, the method includes receiving, by the MCPTT server, a first-to-answer call response from one or more candidate MCPTT recipient clients among the plurality of MCPTT recipient clients. Further, the method includes sending, by the MCPTT server, the first-to-answer call response to the MCPTT originating client to establish a media plane between the MCPTT client and the one or more candidate MCPTT recipient clients.

In an embodiment, receiving, by the MCPTT server, the first-to-answer call request from the MCPTT originating client includes receiving a first-to-answer query request from the MCPTT originating client, sending the first-to-answer query request to the plurality of MCPTT recipient clients, receiving a first-to-answer query response from the one or more candidate MCPTT recipient clients among the plurality of MCPTT recipient clients, and receiving the first-to-answer call request from the MCPTT originating client.

In an embodiment, the first-to-answer call request includes but not limited to a Group Identifier, the plurality of MCPTT recipient clients, a resource list, a URI, and a Group URI.

In an embodiment, the method further includes sending a first-to-answer call cancel request to at least one non-candidate MCPTT recipient client among the plurality of MCPTT recipient clients.

In an embodiment, the method further includes sending the first-to-answer call cancel request after receiving a first-to-answer call response from the at least one non-candidate MCPTT recipient client among the plurality of MCPTT recipient clients.

Accordingly, the embodiment herein is to provide a method for managing a first-to-answer call in a MCPTT communication. The method includes receiving, by a MCPTT server, a first-to-answer call back request from a MCPTT originating client. Further, the method includes sending, by the MCPTT server, the first-to-answer call back request to a plurality of MCPTT recipient clients. Further, the method includes receiving, by the MCPTT server, a first-to-answer call request from one or more candidate MCPTT recipient clients. Further, the method includes sending, by the MCPTT server, the first-to-answer call request to the MCPTT originating client.

In an embodiment, the method further includes receiving, by the MCPTT server, a first-to-answer call response from the MCPTT originating client and sending, by the MCPTT server, the first-to-answer call response to the one or more candidate MCPTT recipient clients to establish a media plane between the MCPTT originating client and the one or more candidate MCPTT recipient clients.

In an embodiment, the method further includes receiving, by the MCPTT server, a first-to-answer call request from at least one non-candidate MCPTT recipient client. Further, the method includes sending, by the MCPTT server, the first-to-answer call request to the MCPTT originating client. Further, the method includes receiving, by the MCPTT server, a first-to-answer reject message from the MCPTT originating client. Further, the method includes sending, by the MCPTT server, the first-to-answer reject message to the at least one non-candidate MCPTT recipient client.

In an embodiment, the first-to-answer call back request includes but not limited to a Group Identifier, the plurality of MCPTT recipient clients, a resource list, a URI, and a Group URI.

Accordingly, the embodiment herein is to provide a method for managing a first-to-answer call in a MCPTT communication. The method includes receiving, by a MCPTT recipient client, a first-to-answer call request from a MCPTT server. Further, the method includes sending, by the candidate MCPTT recipient clients, a first-to-answer call response to the MCPTT server.

In an embodiment, receiving the first-to-answer call request from the MCPTT server includes receiving a first-to-answer query request from the MCPTT server, sending a first-to-answer query response to the MCPTT server, and receiving the first-to-answer call request from the MCPTT server.

Accordingly, the embodiment herein is to provide a method for managing a first-to-answer call in a MCPTT communication. The method includes receiving, by a MCPTT recipient client, a first-to-answer call back request from a MCPTT server. Further, the method includes sending, by the candidate MCPTT recipient client, a first-to-answer call request to the MCPTT server. Further, the method includes receiving, by the MCPTT recipient client, a first-to-answer call response from the MCPTT server.

In an embodiment, the method further includes establishing a media plane between a MCPTT originating client and the MCPTT recipient client through the MCPTT server, in response to receiving the first-to-answer call response.

In an embodiment, the proposed method relates to MCPTT technology. Normally, in public safety private call is a communication between a pair of MCPTT users using the MCPTT service with or without a MCPTT floor control. Further, a private call can be initiated with a certain commencement mode, which is a setting that determines the conditions under which a call is initiated. The commencement mode can be automatic or manual. The private call in which the initiation of the private call does not require any action on the part of the receiving MCPTT user is defined to be an automatic commencement mode. On the contrary, manual commencement mode is the private call in which the initiation of the private call requires the receiving MCPTT user to perform some action to accept or reject the private call setup.

Further, the proposed method in particular relates to the first-to-answer calls where the user initiates a call to multiple users and the first user to respond or answer is the one with which the private call is established. The aspects that are considered in the solution include the users existing in the multiple MCPTT systems, requests with and without the floor control, during the automatic and manual commencement modes and while call forwarding to voicemail systems. Multiple MCPTT systems are an example where communication is established across two systems in different domains.

In an embodiment, a method is proposed for frequently using the first-to-answer calls where the user places the call to the multiple users and the first user to respond or answer is the one with which the private call is established. The aspects that are considered in the solution include users existing in multiple MCPTT systems, requests with and without the floor control, during the automatic and manual commencement modes and while call forwarding to the voicemail.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

The principal object of the embodiments herein is to provide a system and method for establishing a first-to-answer call in a MCPTT communication between users.

Another object of the embodiments herein is to provide a system and method to support the first-to-answer public safety private calls or simply referred as a MCPTT first-to-answer call.

Another object of the embodiments herein is to provide a method for receiving, by a MCPTT originating client, a first-to-answer call response corresponding to one or more candidate MCPTT recipient clients among a plurality of MCPTT recipient clients from a MCPTT server.

Another object of the embodiments herein is to provide a method for establishing, by the MCPTT client, a media plane with the one or more candidate MCPTT recipient clients through the MCPTT server.

Another object of the embodiments herein is to provide a method for sending, by a MCPTT originating client, a first-to-answer call back request to a MCPTT server.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
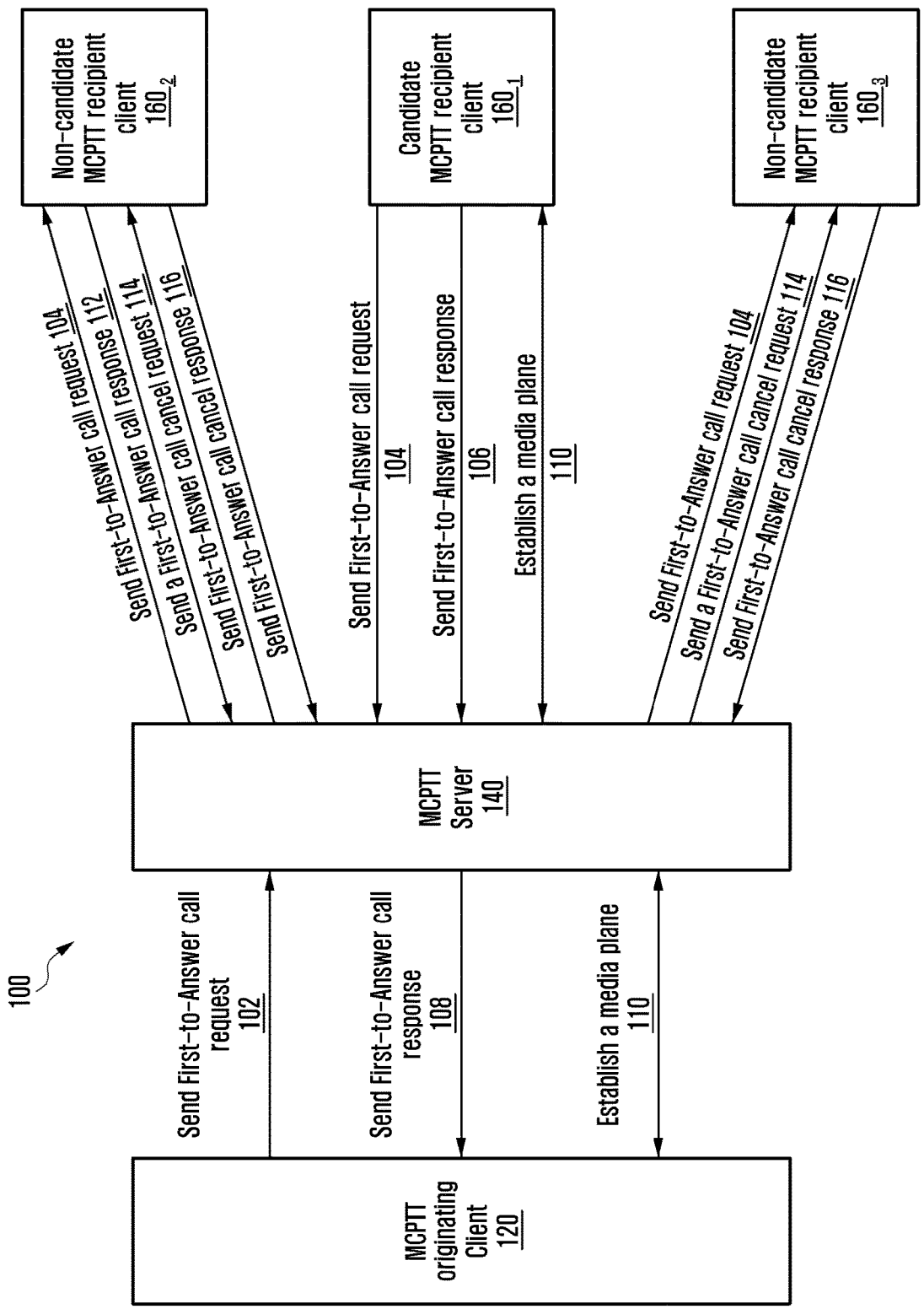
FIG. 1 illustrates a MCPTT system for establishing a first-to-answer call, according to an embodiment as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

First-to-answer call is defined as a call that is started when the first MCPTT user among multiple potential target recipients answers. This call requires the answering First-to-answer MCPTT user to answer manually; automatic answer is not allowed.

Call handling preferences such as voice mail redirection, automatic reply, commencement modes etc., are ignored by the MCPTT recipient client and the user is alerted of the incoming first-to-answer call request.

The embodiments herein provide a method for managing a first-to-answer call in a MCPTT communication. The method includes receiving a first-to-answer call response corresponding to one or more candidate MCPTT recipient client (or MCPTT recipient client) among a plurality of MCPTT recipient clients from a MCPTT server. Further, the method includes establishing, by the MCPTT originating client, a media plane with the one or more candidate MCPTT recipient client through a MCPTT server.

The candidate MCPTT recipient client is the recipient client which responded first among all other MCPTT recipient clients. In an embodiment, one or more candidate MCPTT recipient clients among many MCPTT recipient clients first responds to the call request received from the MCPTT server.

Another embodiment herein provides a method for managing the first-to-answer call in the MCPTT communication. The method includes sending, by the MCPTT originating client, the first-to-answer call back request to the MCPTT server. Further, the method includes receiving, by the MCPTT originating client, the first-to-answer call request corresponding to the one or more candidate MCPTT recipient clients among the plurality of MCPTT recipient clients from the MCPTT server. Further, the method includes sending, by the MCPTT originating client, the first-to-answer call response to the MCPTT server. Further, the method includes establishing, by the MCPTT client, the media plane with the one or more candidate MCPTT recipient clients through the MCPTT server.

Another embodiment herein provides a method for managing the first-to-answer call in the MCPTT communication. The method includes receiving, by the MCPTT server, the first-to-answer call request from the MCPTT originating client. Further, the method includes sending, by the MCPTT server, the first-to-answer call request to the plurality of MCPTT recipient clients. Further, the method includes receiving, by the MCPTT server, the first-to-answer call response from the one or more candidate MCPTT recipient clients among the plurality of MCPTT recipient clients. Further, the method includes sending, by the MCPTT server, the first-to-answer call response to the MCPTT originating client to establish the media plane between the MCPTT originating client and the one or more candidate MCPTT recipient clients.

Another embodiment herein provides a method for managing the first-to-answer call in the MCPTT communication. The method includes receiving, by the MCPTT server, the first-to-answer call back request from the MCPTT originating client. Further, the method includes sending, by the MCPTT server, the first-to-answer call back request to the plurality of MCPTT recipient clients. Further, the method includes receiving, by the MCPTT server, the first-to-answer call request from the one or more candidate MCPTT recipient clients. Further, the method includes sending, by the MCPTT server, the first-to-answer call request to the MCPTT originating client.

Another embodiment herein provides a method for managing the first-to-answer call in the MCPTT communication. The method includes receiving, by a candidate MCPTT recipient client, the first-to-answer call request from the MCPTT server. Further, the method includes sending, by the candidate MCPTT recipient client, the first-to-answer call response to the MCPTT server.

Another embodiment herein provides a method for managing the first-to-answer call in the MCPTT communication. The method includes receiving, by a candidate MCPTT recipient client, the first-to-answer call back request from the MCPTT server. Further, the method includes sending, by the candidate MCPTT recipient client, the first-to-answer call request to the MCPTT server. Further, the method includes receiving, by the candidate MCPTT recipient client, the first-to-answer call response from the MCPTT server.

Unlike conventional systems and methods, the proposed method is frequently used first-to-answer calls where a user of the MCPTT client places a call to multiple users and the first user to respond takes the private call. The aspects that are considered in the proposed method include users existing in multiple MCPTT systems, requests with and without floor control, during automatic and manual commencement modes and while the call forwarding to voicemail.

Referring now to the drawings, and more particularly to FIGS. 1 through 17, where similar reference characters denote corresponding features consistently throughout the figures, there are shown preferred embodiments.

FIG. 1 illustrates a MCPTT system 100 for establishing a first-to-answer call, according to an embodiment as disclosed herein. In an embodiment, the MCPTT system 100 includes a MCPTT originating client 120, a MCPTT server 140, and a plurality of MCPTT recipient clients 1601-N. As shown in the FIG. 1, for convenience, the plurality of MCPTT recipient clients 1601-3 (i.e., a candidate MCPTT recipient client 1601, and non-candidate MCPTT recipient clients 1602 and 1603) are shown. It is to be understood that any number of MCPTT recipient clients can be shown in the MCPTT system 100 without departing from the scope of the invention.

The MCPTT client 120, the candidate MCPTT recipient client 1601, and the non-candidate MCPTT recipient clients 1602 and 1603 can be, for example, a User Equipment (UE), a laptop, a desktop computer, a mobile phone, a mobile terminal, a mobile station, a smart phone, Personal Digital Assistants (PDAs), a tablet, a phablet, a consumer electronic device, dual display devices, or any other electronic device. The MCPTT system 100 shows a sequence of steps between the MCPTT client 120, the MCPTT server 140, the plurality of MCPTT recipient clients 1601-3 as described below:

At step 102, the MCPTT originating client 120 can be configured to send a first-to-answer call request to the MCPTT server 140. In an embodiment, the first-to-answer call request includes a Group Identifier, the plurality of MCPTT recipient clients 1601-1603, a resource list, a URI, and a Group URI either alone or in combination thereof.

At step 104, after receiving the first-to-answer call request, the MCPTT server 140 can be configured to forward (or send) the first-to-answer request to the candidate MCPTT recipient client 1601, and non-candidate MCPTT recipient clients 1602 and 1603 (i.e., MCPTT users).

At step 106, the candidate MCPTT recipient client 1601 can be configured to send a first-to-answer call response to the MCPTT server 140.

In an embodiment, more than one candidate MCPTT recipient client can send the first-to-answer call response to the MCPTT server 140. However, for sake for explanation, only one candidate MCPTT recipient client 1601 is depicted and explained herein.

At step 108, after receiving the first-to-answer call response from the candidate MCPTT recipient client 1601, the MCPTT server 140 can be configured to send (forward) the first-to-answer call response to the MCPTT originating client 120.

At step 110, the MCPTT client 120 can be configured to establish a media plane with the candidate MCPTT recipient client 1601 through the MCPTT server 140. After establishing the media plane, the MCPTT originating client 120 and the candidate MCPTT recipient client 1601 enters into a first-to-answer call communication.

At step 112, the non-candidate MCPTT recipient client 1602 can be configured to send the first-to-answer call response to the MCPTT server 140.

At step 114, after receiving the first-to-answer call response, the MCPTT server 140 can be configured to send a first-to-answer call cancel request to the non-candidate MCPTT recipient clients 160_2 and 160_3 other than the candidate MCPTT recipient client 160_1.

At step 116, the non-candidate MCPTT recipient clients 160_2 and 160_3 can be configured to send a first-to-answer call cancel response to the MCPTT server 140.

The FIG. 1 shows exemplary MCPTT system 100 but it is to be understood that other embodiments are not limited thereon. In other embodiments, the MCPTT system 100 may include less or more numbers of MCPTT originating clients and MCPTT recipient clients. Further, one or more MCPTT originating clients can interact with other MCPTT recipient clients for establishing the first-to-answer call in the MCPTT communication.

Figure 2:
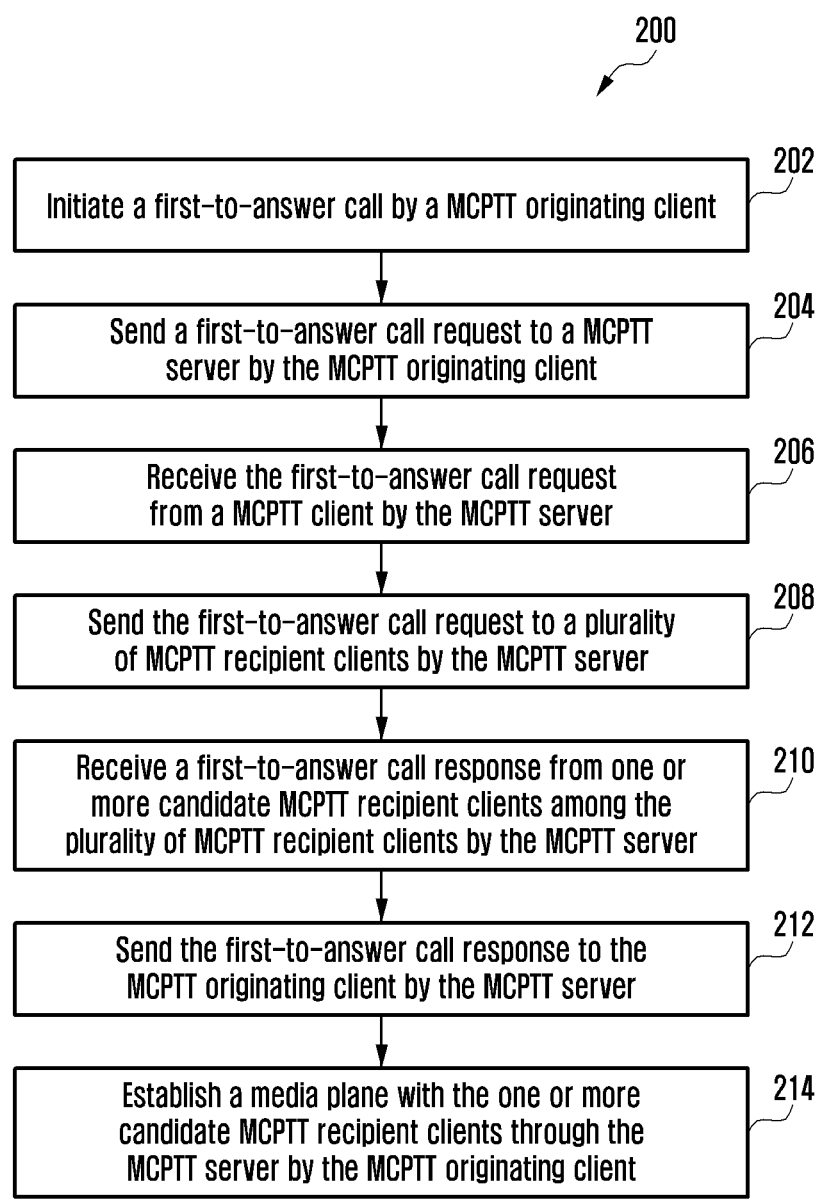
FIG. 2 is a flow chart illustrating a method for establishing a first-to-answer call in a MCPTT communication, according to an embodiment as disclosed herein.

FIG. 2 is a flow chart 200 illustrating a method for establishing the first-to-answer call in the MCPTT communication, according to an embodiment as disclosed herein. At step 202, the method includes initiating the first-to-answer call. The method allows the MCPTT originating client 120 to initiate the first-to-answer call. At step 204, the method includes sending the first-to-answer call request to the MCPTT server 140. The method allows the MCPTT originating client 120 to send the first-to-answer call request to the MCPTT server 140. In an embodiment, the first-to-answer call request includes but not limited to the Group Identifier, the plurality of MCPTT recipient clients 160_1-3, the resource list, the URI, and the Group URI either alone or in combination thereof.

At step 206, the method includes receiving the first-to-answer call request from the MCPTT originating client 120. The method allows the MCPTT server 140 to receive the first-to-answer call request from the MCPTT originating client 120. At step 208, the method includes sending the first-to-answer call request to the plurality of MCPTT recipient clients 160_1-3. The method allows the MCPTT server 140 to send the first-to-answer call request to the plurality of MCPTT recipient clients 160_1-3. At step 210, the method includes receiving the first-to-answer call response from the candidate MCPTT recipient client 160_1 among the plurality of MCPTT recipient clients 160_1-3. The method allows the MCPTT server 140 to receive the first-to-answer call response from the candidate MCPTT recipient client 160_1 among the plurality of MCPTT recipient clients 160_1-3.

At step 212, the method includes sending the first-to-answer call response to the MCPTT originating client 120. The method allows the MCPTT server 140 to send the first-to-answer call response to the MCPTT originating client 120. At step 214, the method includes receiving the first-to-answer call response from the MCPTT server 140. The method allows the MCPTT originating client 120 to receive the first-to-answer call response from the MCPTT server 140. At step 216, the method includes establishing the media plane with the candidate MCPTT recipient client 160_1. The method allows the MCPTT originating client 120 to establish the media plane with the candidate MCPTT recipient client 160_1 through the MCPTT server 140.

The various actions, acts, blocks, steps, or the like in the flow chart 200 may be performed in the order presented, in a different order or simultaneously. Further, in some embodiments, some of the actions, acts, blocks, steps, or the like may be omitted, added, modified, skipped, or the like without departing from the scope of the invention.

Figure 3:
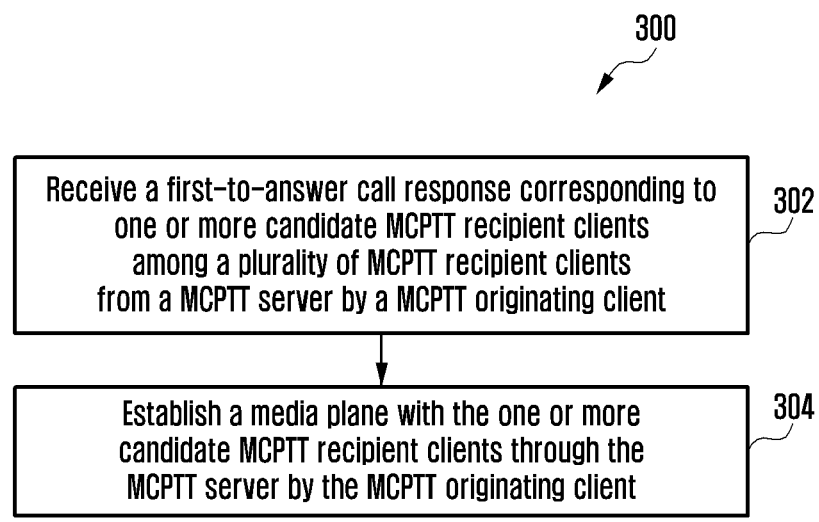
FIG. 3 is a flow chart illustrating sequence of operations performed by a MCPTT originating client for managing a first-to-answer call in a MCPTT communication, according to an embodiment as disclosed herein.

FIG. 3 is a flow chart 300 illustrating sequence of operations performed by the MCPTT originating client 120 for managing the first-to-answer call in the MCPTT communication, according to an embodiment as disclosed herein. At step 302, the method includes receiving the first-to-answer call response corresponding to the candidate MCPTT recipient client 160_1 among the plurality of MCPTT recipient clients 160_1-3 from the MCPTT server 140. The method allows the MCPTT originating client 120 to receive the first-to-answer call response corresponding to the candidate MCPTT recipient client 160_1 among the plurality of MCPTT recipient clients 160_1-3 from the MCPTT server 140.

At step 304, the method includes establishing the media plane with the candidate MCPTT recipient client 160_1. The method allows the MCPTT originating client 120 to establish the media plane with the candidate MCPTT recipient client 160_1.

It is to be understood to a person of ordinary skill in the art, that the MCPTT originating client 120 can establish the media plane with more than one candidate MCPTT recipient clients.

The various actions, acts, blocks, steps, or the like in the flow chart 300 may be performed in the order presented, in a different order or simultaneously. Further, in some embodiments, some of the actions, acts, blocks, steps, or the like may be omitted, added, modified, skipped, or the like without departing from the scope of the invention.

Figure 4:
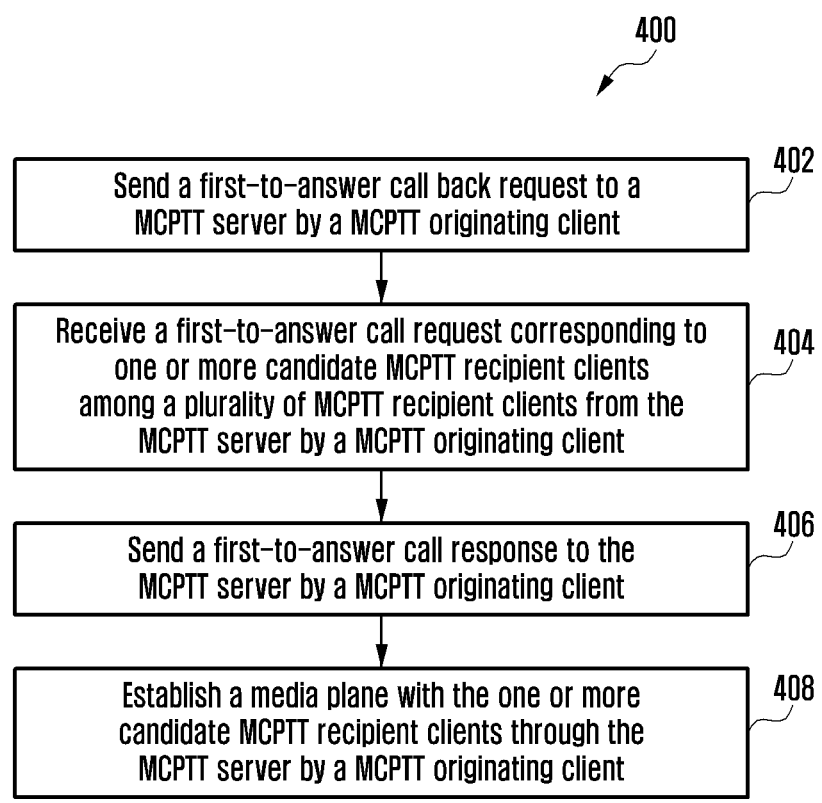
FIG. 4 is a flow chart illustrating sequence of operations performed by a MCPTT originating client for managing a first-to-answer call in a MCPTT communication, according to an embodiment as disclosed herein.

FIG. 4 is a flow chart 400 illustrating sequence of operations performed by the MCPTT originating client 120 for managing the first-to-answer call in the MCPTT communication, according to an embodiment as disclosed herein. At step 402, the method includes sending a first-to-answer call back request to the MCPTT server 140. The method allows the MCPTT originating client 120 to send the first-to-answer call back request to the MCPTT server 140.

At step 404, the method includes receiving a first-to-answer call request corresponding to corresponding to the candidate MCPTT recipient client 160_1 among the plurality of MCPTT recipient clients 160_1-3 from the MCPTT server 120. The method allows the MCPTT originating client 120 to receive the first-to-answer call request corresponding to corresponding to the candidate MCPTT recipient client 160_1 among the plurality of MCPTT recipient clients 160_1-3 from the MCPTT server 140.

At step 406, the method includes sending the first-to-answer call response to the MCPTT server 140. The method allows the MCPTT originating client 120 to send the first-to-answer call response to the MCPTT server 140. At step 408, the method includes establishing the media plane with the candidate MCPTT recipient client 160_1. The method allows the MCPTT originating client 120 to establish the media plane with the candidate MCPTT recipient client 160_1 through the MCPTT server 140.

The various actions, acts, blocks, steps, or the like in the flow chart 400 may be performed in the order presented, in a different order or simultaneously. Further, in some embodiments, some of the actions, acts, blocks, steps, or the like may be omitted, added, modified, skipped, or the like without departing from the scope of the invention.

Figure 5:
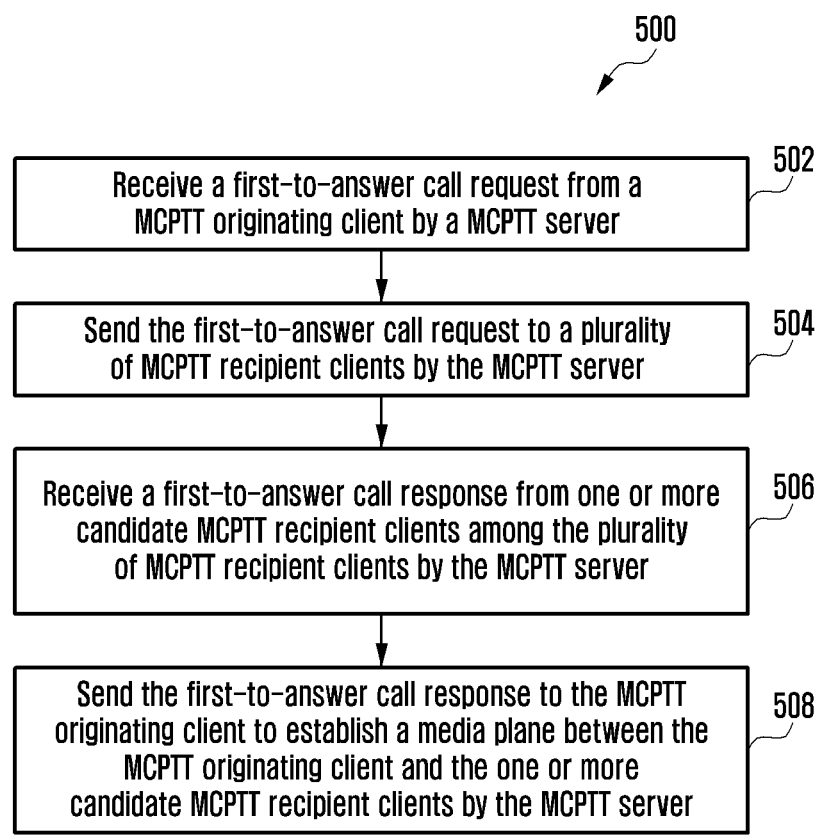
FIG. 5 is a flow chart illustrating sequence of operations performed by a MCPTT server for managing a first-to-answer call in a MCPTT communication, according to an embodiment as disclosed herein.

FIG. 5 is a flow chart 500 illustrating sequence of operations performed by the MCPTT server 140 for managing the first-to-answer call in the MCPTT communication, according to an embodiment as disclosed herein. At step 502, the method includes receiving the first-to-answer call request from the MCPTT originating client 120. The method allows the MCPTT server 120 to receive the first-to-answer call request from the MCPTT originating client 120.

At step 504, the method includes sending the first-to-answer call request to the plurality of MCPTT recipient clients 160_1-3. The method allows the MCPTT server 140 to send the first-to-answer call request to the plurality of MCPTT recipient clients $160_{1-3}$. At step 506, the method includes receiving the first-to-answer call response from the candidate MCPTT recipient client $160_1$ among the plurality of MCPTT recipient clients $160_{1-3}$. The method allows the MCPTT server 140 to receive the first-to-answer call response from the candidate MCPTT recipient client $160_1$ among the plurality of MCPTT recipient clients $160_{1-3}$.

At step 508, the method includes sending the first-to-answer call response to the MCPTT originating client 120 to establish the media plane between the MCPTT originating client 120 and the candidate MCPTT recipient client $160_1$. The method allows the MCPTT server 140 to send the first-to-answer call response to the MCPTT originating client 120 to establish the media plane between the MCPTT client 120 and the candidate MCPTT recipient client $160_1$.

The various actions, acts, blocks, steps, or the like in the flow chart 500 may be performed in the order presented, in a different order or simultaneously. Further, in some embodiments, some of the actions, acts, blocks, steps, or the like may be omitted, added, modified, skipped, or the like without departing from the scope of the invention.

Figure 6:
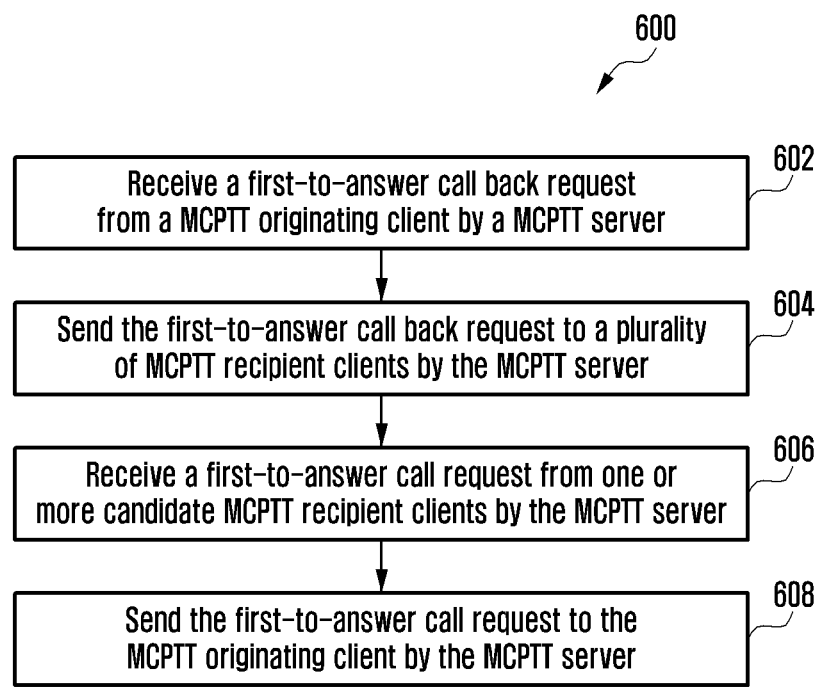
FIG. 6 is a flow chart illustrating sequence of operations performed by a MCPTT server for managing a first-to-answer call in a MCPTT communication, according to an embodiment as disclosed herein.

FIG. 6 is a flow chart 600 illustrating sequence of operations performed by the MCPTT server 140 for managing the first-to-answer call in the MCPTT communication, according to an embodiment as disclosed herein. At step 602, the method includes receiving the first-to-answer call back request from the MCPTT originating client 120. The method allows the MCPTT server 140 to receive the first-to-answer call back request from the MCPTT client 120. At step 604, the method includes sending the first-to-answer call back request to the plurality of MCPTT recipient clients 1601-3. The method allows the MCPTT server 140 to send the first-to-answer call back request to the plurality of MCPTT recipient clients $160_{1-3}$.

At step 606, the method includes receiving the first-to-answer call request from the candidate MCPTT recipient client $160_1$. The method allows the MCPTT server 140 to receive the first-to-answer call request from the candidate MCPTT recipient client 1601. At step 608, the method includes sending the first-to-answer call request to the MCPTT originating client 120. The method allows the MCPTT server 140 to send the first-to-answer call request to the MCPTT originating client 120.

The various actions, acts, blocks, steps, or the like in the flow chart 600 may be performed in the order presented, in a different order or simultaneously. Further, in some embodiments, some of the actions, acts, blocks, steps, or the like may be omitted, added, modified, skipped, or the like without departing from the scope of the invention.

Figure 7:
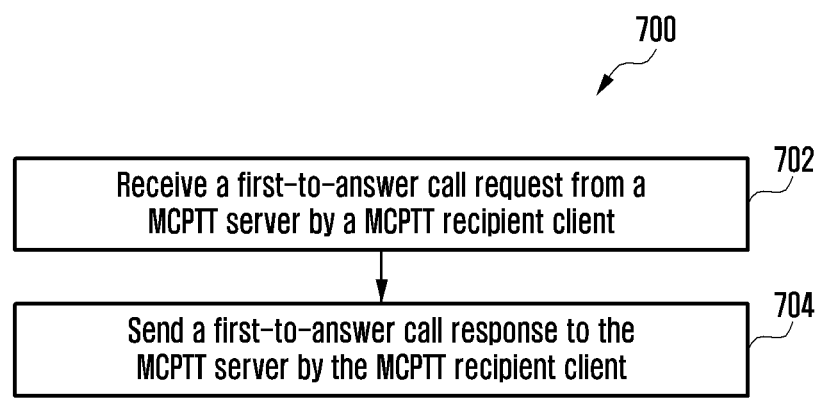
FIG. 7 is a flow chart illustrating sequence of operations performed by a MCPTT recipient client, according to an embodiment as disclosed herein.

FIG. 7 is a flow chart 700 illustrating sequence of operations performed by the candidate MCPTT recipient client 1601, according to an embodiment as disclosed herein. At step 702, the method includes receiving the first-to-answer call request from the MCPTT server 140. The method allows the candidate MCPTT recipient client 1601 to receive the first-to-answer call request from the MCPTT server 140.

At step 704, the method includes sending the first-to-answer call response to the MCPTT server 140. The method allows the candidate MCPTT recipient client $160_1$ to send the first-to-answer call response to the MCPTT server 140.

The various actions, acts, blocks, steps, or the like in the flow chart 700 may be performed in the order presented, in a different order or simultaneously. Further, in some embodiments, some of the actions, acts, blocks, steps, or the like may be omitted, added, modified, skipped, or the like without departing from the scope of the invention.

Figure 8:
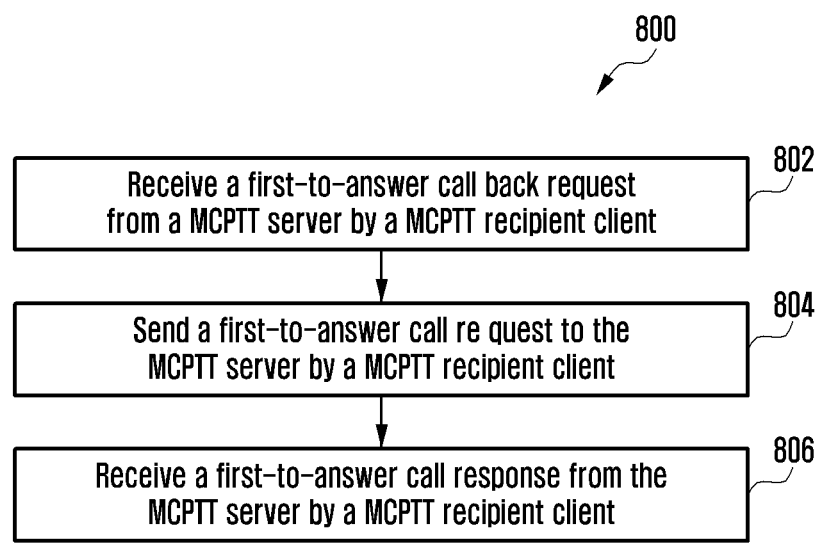
FIG. 8 is a flow chart illustrating sequence of operations performed by a MCPTT recipient client, according to an embodiment as disclosed herein.

FIG. 8 is a flow chart 800 illustrating sequence of operations performed by the candidate MCPTT recipient client $160_1$, according to an embodiment as disclosed herein. At step 802, the method includes receiving the first-to-answer call back request from the MCPTT server 140. The method allows the candidate MCPTT recipient client $160_1$ to receive the first-to-answer call back request from the MCPTT server 140.

At step 804, the method includes sending the first-to-answer call request to the MCPTT server 140. The method allows the candidate MCPTT recipient client $160_1$ to send the first-to-answer call request to the MCPTT server 140. At step 806, the method includes receiving the first-to-answer call response from the MCPTT server 140. The method allows the candidate MCPTT recipient client $160_1$ to receive the first-to-answer call response from the MCPTT server 140.

The various actions, acts, blocks, steps, or the like in the flow chart 800 may be performed in the order presented, in a different order or simultaneously. Further, in some embodiments, some of the actions, acts, blocks, steps, or the like may be omitted, added, modified, skipped, or the like without departing from the scope of the invention.

Figure 9:
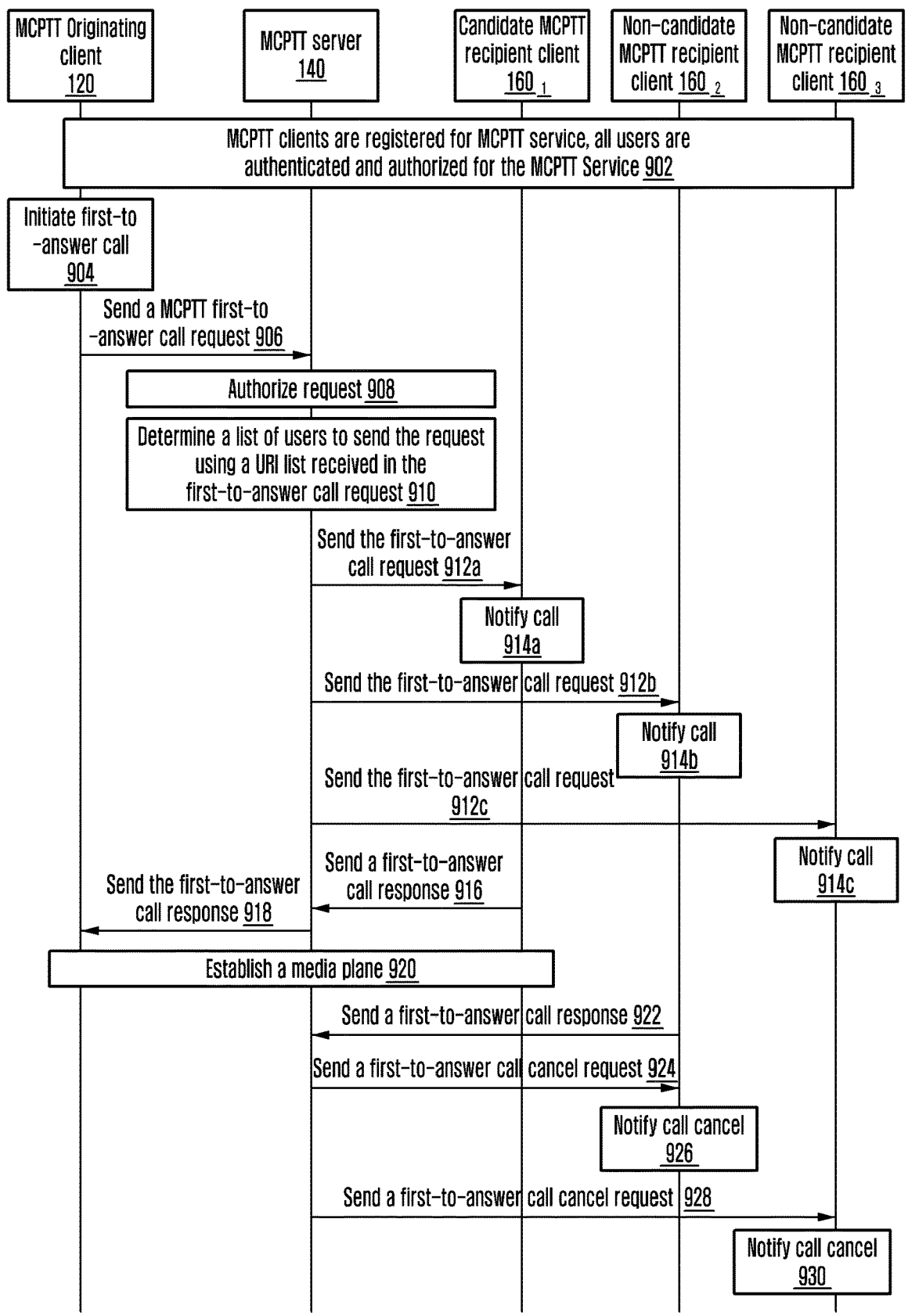
FIG. 9 is a sequence diagram illustrating a signaling control plane procedure for a MCPTT originating client initiating establishment of a first-to-answer call with a plurality of MCPTT recipient clients (or multiple potential target recipients) indicated in a URI list in a first-to-answer call request (or originating request), according to an embodiment as disclosed herein.

FIG. 9 is a sequence diagram illustrating a signaling control plane procedure for the MCPTT originating client 120 initiating establishment of the first-to-answer call with the plurality of MCPTT recipient clients 1601-3 (or multiple potential target recipients) indicated in the URI list in the first-to-answer call request (or originating request), according to an embodiment as disclosed herein.

Using URI List:

The FIG. 9 shows basic signaling control plane procedures for the MCPTT originating client 120 initiating establishment of the first-to-answer call with the multiple potential target recipients indicated in the URI list in the originating request. The URI list implies a list of URIs representing the target recipients.

Pre-conditions: Initially, the calling MCPTT user (i.e., user of the MCPTT originating client 120) has selected first-to-answer call. The sequence of steps is described below:

At step 902, the plurality of MCPTT recipient clients 1601-3 are registered and their respective users. Further, the plurality of MCPTT recipient clients 1601-3, are authenticated and authorized to use the MCPTT service.

At step 904, the MCPTT user at the MCPTT originating client 120 initiates the first-to-answer call for plurality of MCPTT recipient clients 1601-3. For the first-to-answer call with a floor control, the floor control is to be established. For the first-to-answer call without a floor control, both users have the ability to transmit without floor arbitration.

At step 906, the MCPTT originating client 120 sends the first-to-answer call request (or MCPTT first-to-answer call request) including the plurality of MCPTT recipient clients 1601-3 (or multiple potential target recipients) indicated as the URI list using an MCPTT service identifier as defined in 3GPP TS 23.228 (possible for the Session Initiation Protocol (SIP) core to route the request to the MCPTT server 140). In an embodiment, the first-to-answer call request includes a MCPTT Identifier of inviting or originating user and a Session Description Protocol (SDP) offer containing one or more media types. In another embodiment, the first-to-answer call request includes a data element that indicates that the MCPTT originating client 120 is requesting the floor, for the first-to-answer call with the floor control. Further, the MCPTT originating client 120 includes a first-to-answer call that indicates that the call is to be established only to the first answering user of one of the MCPTT recipient client among the plurality of MCPTT recipient clients 1601-3.

At step 908, the MCPTT server 140 may confirm that the MCPTT users of the plurality of MCPTT recipient clients 1601-3 are authorized for the first-to-answer call.

At step 910, the MCPTT server 140 checks the first-to-answer call setting of the MCPTT client 120 and determines the list of MCPTT users to send the first-to-answer call request, based on the URI list obtained from the first-to-answer call request from the MCPTT originating client 120.

At steps 912a, 912b, and 912c, the MCPTT server 140 includes information that it communicates using the MCPTT service, offers the same media types or a subset of the media types contained in the initial received first-to-answer call request and sends similar first-to-answer call request to each URI in the list, including the MCPTT Identifier of the calling MCPTT user of the MCPTT originating client 120. If one or more called MCPTT users have registered to the MCPTT service with multiple MCPTT UEs and has designated the MCPTT UE for receiving the private calls, then the incoming first-to-answer call request is delivered only to the designated MCPTT UE. Otherwise, the first-to-answer call request is delivered to all the registered MCPTT UEs.

At step 914a, 914b, and 914c, the MCPTT user of the candidate MCPTT recipient client $160_1$ and the non-candidate MCPTT recipient clients $160_2$ and $160_3$ is alerted. A provisional response such as ringing is sent back towards the MCPTT server 140 by the candidate MCPTT recipient client $160_1$ and the non-candidate MCPTT recipient clients $160_2$ and 1603. In an embodiment, in certain cases where an automatic answer or a voicemail is configured at the terminating side, such settings are not applied for the incoming first-to-answer call request. Alternatively, a busy or reject response is sent back for the recipient user.

At step 916, the MCPTT user of the candidate MCPTT recipient client $160_1$ has accepted the call (i.e., has taken some action to accept via the user interface) which causes the candidate MCPTT recipient client $160_1$ to send the first-to-answer call response to the MCPTT server 140 as shown in the FIG. 9. If the MCPTT user of the candidate MCPTT recipient client $160_1$ has not accepted the incoming call then, the candidate MCPTT recipient client $160_1$ sends a call failure response to the MCPTT server 140 without adding (or indicating) reason for call failure.

At step 918, the MCPTT server 140 sends the first-to-answer call response to the MCPTT originating client 120 indicating that the MCPTT user of the candidate MCPTT recipient client $160_1$ has accepted the first-to-answer call, including the accepted media parameters.

At step 920, the media plane for communication is then established between the MCPTT originating client 120 and the candidate MCPTT recipient client $160_1$ through the MCPTT server 140. In an embodiment, either user can transmit media individually using the floor control. For successful call establishment for the first-to-answer call with the floor request from the MCPTT originating client 120, the floor participant associated with MCPTT originating client 120 is granted the floor initially. At the same time, the floor participant associated with the candidate MCPTT recipient client $160_1$ is informed that the floor is taken. The meaning of the floor request (give floor initially to originator [i.e., MCPTT originating client 120], or give floor initially to the target [i.e., candidate MCPTT recipient client 1601] may be configurable. In an embodiment, for the first-to-answer call without the floor control both the users are allowed to transmit simultaneously.

At step 922, if the MCPTT user of the non-candidate MCPTT recipient client $160_3$ has also accepted the call (i.e., has taken some action to accept via the user interface) which causes the non-candidate MCPTT recipient client $160_3$ to send the first-to-answer call response to the MCPTT server 140.

At step 924, since the response from the non-candidate MCPTT recipient client 1603 reached the MCPTT server 140 after indicating that the MCPTT user of the candidate MCPTT recipient client $160_1$ has accepted the call, the MCPTT server 140 sends the first-to-answer call cancel request to the non-candidate MCPTT recipient client 1602.

At step 926, the MCPTT user of the non-candidate MCPTT recipient client $160_2$ may be notified that the call is terminated or released with a reason for call termination.

At step 928, the MCPTT server 140 sends the first-to-answer cancel request to the non-candidate MCPTT recipient client 1603. This step may happen immediately after step 920.

At step 930, the non-candidate MCPTT recipient client $160_3$ may be notified that the call is terminated or released with a reason for call termination.

Figure 10:
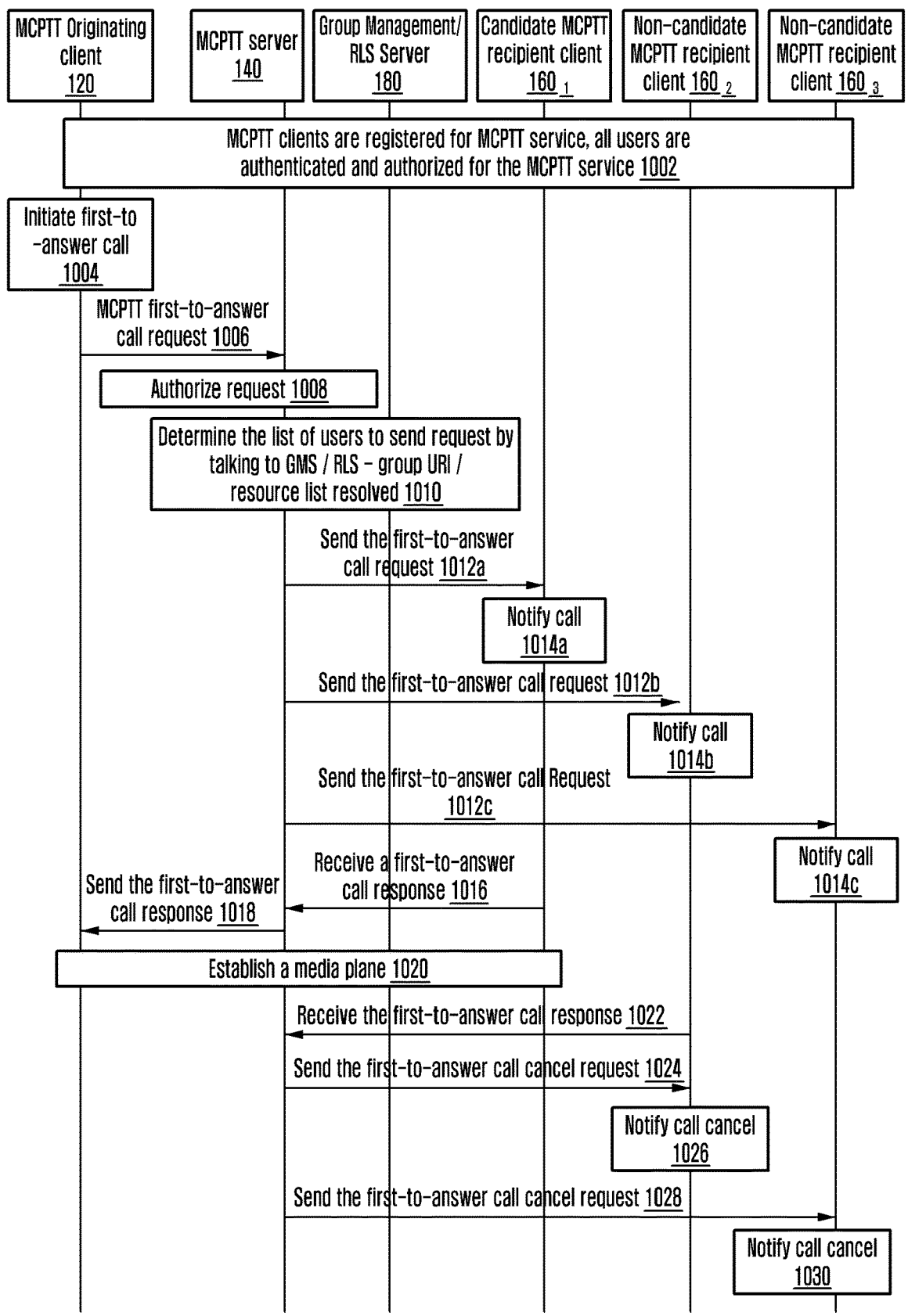
FIG. 10 is a sequence diagram illustrating signaling control plane procedures for a MCPTT originating client initiating establishment of a first-to-answer call (or MCPTT first-to-answer private call) with a plurality of MCPTT recipient clients indicated as a Group URI in an originating request, according to an embodiment as disclosed herein.

FIG. 10 is a sequence diagram illustrating signaling control plane procedures for the MCPTT originating client 120 initiating establishment of the first-to-answer call with the plurality of MCPTT recipient clients $160_{1-3}$ indicated as the Group URI in the first-to-answer call request, according to an embodiment as disclosed herein.

Using the Group URI or Resource List:

Pre-conditions: The calling MCPTT user has selected first-to-answer call. The Group URI or the Resource List is assumed to be pre-configured with the members at the Group Management Server or Resource List Server 180. The sequence of steps is described below:

At step 1002, the plurality of MCPTT recipient clients $160_{1-3}$ are registered and their respective users, MCPTT user-1 to MCPTT user-3, are authenticated and authorized to use the MCPTT service.

At step 1004, the MCPTT user at the MCPTT originating client 120 initiates the first-to-answer call for the selected Group URI.

At step 1006, the MCPTT originating client 120 sends the first-to-answer call request including the Group URI or Resource List, using an MCPTT service identifier as defined in 3GPP TS 23.228 (possible for the SIP core to route the request to the MCPTT server 140). In an embodiment, the first-to-answer call request contains the MCPTT ID of inviting user and an SDP offer containing one or more media types. In another embodiment, the first-to-answer call request includes the data element that indicates that the MCPTT originating client 120 is requesting the floor, for the first-to-answer call with the floor control. The MCPTT originating client 120 includes the first-to-answer call that indicates that the call is to be established only to the first answering user.

At step 1008, the MCPTT server 140 confirms that the MCPTT users are authorized for the first-to-answer call.

At step 1010, the MCPTT server 140 checks the first-to-answer call setting of the called MCPTT originating client 120 and determines the list of MCPTT users to send the request by fetching the members of the Group URI or Resource List talking to the Group Management Server or Resource List Server 180.

At steps 1012a, 1012b, and 1012c, the MCPTT server 140 includes the information that it communicates using the MCPTT service, offers the same media types or a subset of the media types contained in the initial received request and sends the similar first-to-answer call request to each URI in the list, including the MCPTT ID of the MCPTT originating client 120. If one or more called MCPTT users have registered to the MCPTT service with multiple MCPTT recipient clients and has designated the MCPTT recipient client for receiving the private calls, then the incoming first-to-answer call request is delivered only to the designated MCPTT recipient client. Otherwise, the first-to-answer call request may be delivered to all the registered MCPTT recipient clients.

At steps 1014a, 1014b, and 1014c, the MCPTT user is alerted. In cases where the automatic answer or the voicemail is configured at the terminating side, such settings are not applied for the incoming first-to-answer call request.

At step 1016, the MCPTT user of the candidate MCPTT recipient client 1601 accepts the call (i.e., has taken some action to accept the call via, the user interface) which causes the candidate MCPTT recipient client 1601 to send the first-to-answer call response to the MCPTT server 140. If the MCPTT user of the candidate MCPTT recipient client 1601 has not accepted the incoming call, the of the candidate MCPTT recipient client $160_1$ sends a call failure response to the MCPTT server 140 without adding reason for call failure.

At step 1018, the MCPTT server 140 sends the first-to-answer call response to the MCPTT client $160_1$ indicating that the MCPTT user of the candidate MCPTT recipient client $160_1$ has accepted the call, including the accepted media parameters.

At step 1020, the media plane for communication is established between the MCPTT originating client 120 and the candidate MCPTT recipient client 1601 through the MCPTT server 140. Either user can transmit the media individually by using the floor control. For successful call establishment for the first-to-answer call with the floor request from the MCPTT originating client 120, the floor participant associated with the MCPTT originating client 120 is granted the floor initially. At the same time, the floor participant associated with the candidate MCPTT recipient client $160_2$ is informed that the floor is taken. The meaning of the floor request (give floor initially to the originator [MCPTT originating client 120], or give floor initially to the target [candidate MCPTT recipient client $160_2$]) may be configurable. For the first-to-answer call without the floor control, both the users are allowed to transmit simultaneously.

At step 1022, If the MCPTT user of the non-candidate MCPTT recipient client $160_2$ has also accepted the call (i.e., has taken some action to accept via the user interface) which causes the non-candidate MCPTT recipient client $160_2$ to send the first-to-answer call response to the MCPTT server 140.

At step 1024, since the response from the non-candidate MCPTT recipient client $160_2$ reached the MCPTT server 140 after indicating that the MCPTT user of the candidate MCPTT recipient client $160_1$ has accepted the call to the MCPTT user of the MCPTT originating client 120, the MCPTT server 140 sends the first-to-answer cancel request to the non-candidate MCPTT recipient client $160_2$.

At step 1026, the MCPTT user of the non-candidate MCPTT recipient client $160_2$ may be notified that the call is terminated or released with a reason for call termination.

At step 1028, the MCPTT server 140 sends the first-to-answer cancel request to the non-candidate MCPTT recipient client 1603.

At step 1030, the MCPTT user of the non-candidate MCPTT recipient client $160_3$ is notified that the call is terminated or released with a reason for call termination.

Figure 11:
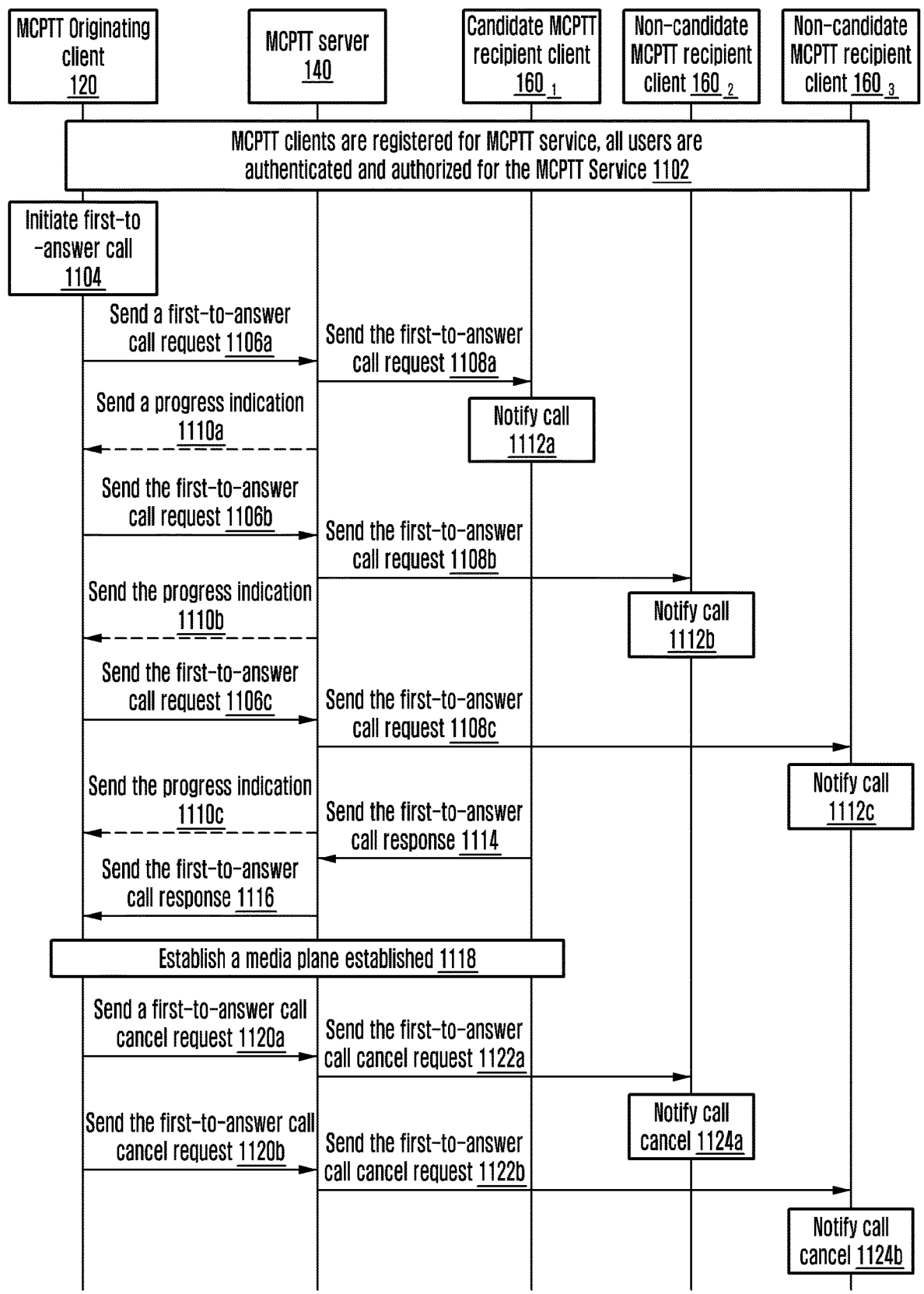
FIG. 11 is a sequence diagram illustrating signaling control plane procedures for a MCPTT originating client initiating establishment of a first-to-answer call with a plurality of MCPTT recipient clients by client forking, according to an embodiment as disclosed herein.

FIG. 11 is a sequence diagram illustrating signaling control plane procedures for the MCPTT originating client 120 initiating establishment of the first-to-answer call with the plurality of MCPTT recipient clients $160_{1-3}$ by client forking, according to an embodiment as disclosed herein.

Using Client Forking:

Pre-conditions: The MCPTT user of the MCPTT originating client 120 has selected the first-to-answer call. The sequence of steps is described below:

At step 1102, the MCPTT originating clients (i.e., the MCPTT originating client 120 and the plurality of MCPTT recipient clients $160_{1-3}$) are registered and their respective users, the MCPTT user of each of the MCPTT clients, are authenticated and authorized to use the MCPTT service.

At step 1104, the MCPTT user of the MCPTT originating client 120 initiates the first-to-answer call for the plurality of MCPTT recipient clients $160_{1-3}$ (i.e., selected multiple potential target recipients).

At steps 1106a, 1106b, 1106c, the MCPTT originating client 120 sends the simultaneous first-to-answer call request for each selected potential target recipients through the MCPTT server 140, using the MCPTT service identifier as defined in 3GPP TS 23.228 (possible for the SIP core to route the request to the MCPTT server 140). In an embodiment, the first-to-answer call request includes the MCPTT ID of inviting user and the SDP offer containing one or more media types. In another embodiment, the first-to-answer call request includes the data element that indicates that MCPTT originating client 120 is requesting the floor, for the first-to-answer call with the floor control. The MCPTT originating client 120 includes the first-to-answer call that indicates that the call is to be established only to the first answering user.

At steps 1108a, 1108b, 1108c, the MCPTT server 140 confirms that the MCPTT users are authorized for the first-to-answer call. Further, the MCPTT server 140 includes the information that it communicates using the MCPTT service, offers the same media types or the subset of the media types contained in each initial received request and forwards (or sends) the first-to-answer call request to the plurality of MCPTT recipient clients 1601-3, including the MCPTT ID of the calling MCPTT user of the MCPTT originating client 120. If one or more MCPTT users have registered to the MCPTT service with multiple MCPTT recipient clients and has designated the MCPTT recipient client for receiving the private calls, then the incoming first-to-answer call request is delivered only to the designated MCPTT recipient client. Otherwise, the first-to-answer call request may be delivered to all the registered MCPTT recipient clients (i.e., the plurality of MCPTT recipient clients 1601-3).

At steps 1110a, 1110b, and 1110c, the MCPTT server 140 sends the progress indication to the MCPTT originating client 120.

At steps 1112a, 1112b, and 1112c, each MCPTT user of the MCPTT recipient clients (i.e., the candidate MCPTT recipient client 1601, the non-candidate MCPTT recipient clients 1602 and $160_3$) is alerted. In cases where the automatic answer or the voicemail is configured at the terminating side, such settings are not applied for the incoming first-to-answer call request.

At step 1114, the MCPTT user of the candidate MCPTT recipient client 1601 has accepted the call (i.e., has taken some action to accept via the user interface) which causes the candidate MCPTT recipient client 160₁ to send the first-to-answer call response to the MCPTT server 140. In an embodiment, if the MCPTT user of the candidate MCPTT recipient client 160₁ has not accepted the incoming call, the candidate MCPTT recipient client 160₁ sends the call failure response to the MCPTT server 140 without adding reason for call failure.

At step 1116, the MCPTT server 140 sends the first-to-answer call response to the MCPTT originating client 120 indicating that the MCPTT user of the candidate MCPTT recipient client 160₁ has accepted the call, including the accepted media parameters.

At step 1118, the media plane for communication is established between the MCPTT originating client 120 and the candidate MCPTT recipient client 1601 through the MCPTT server 140. Either user can transmit the media individually when using the floor control. For successful call establishment for the first-to-answer call with the floor request from the MCPTT originating client 120, the floor participant associated with the MCPTT originating client 120 is granted the floor initially. At the same time the floor participant associated with the candidate MCPTT recipient client 160₁ is informed that the floor is taken. The meaning of the floor request (give floor initially to the originator [i.e., MCPTT originating client 120], or give floor initially to the target [i.e., candidate MCPTT recipient client 160₁]) may be configurable. For the first-to-answer call without the floor control both users are allowed to transmit simultaneously.

At steps 1120a, 1120b, the MCPTT originating client 120 sends the first-to-answer cancel request corresponding to the non-candidate MCPTT recipient clients 160₂ and 160₃ to the MCPTT server 140.

At steps 1122a, 1122b, the MCPTT server 140 sends the first-to-answer cancel request to the non-candidate MCPTT recipient clients 160₂ and 160₃.

At step 1124a, 1124b, the MCPTT user of the non-candidate MCPTT recipient clients 160₂ and 160₃ are notified that the call is terminated or released with the reason for call termination.

Figure 12:
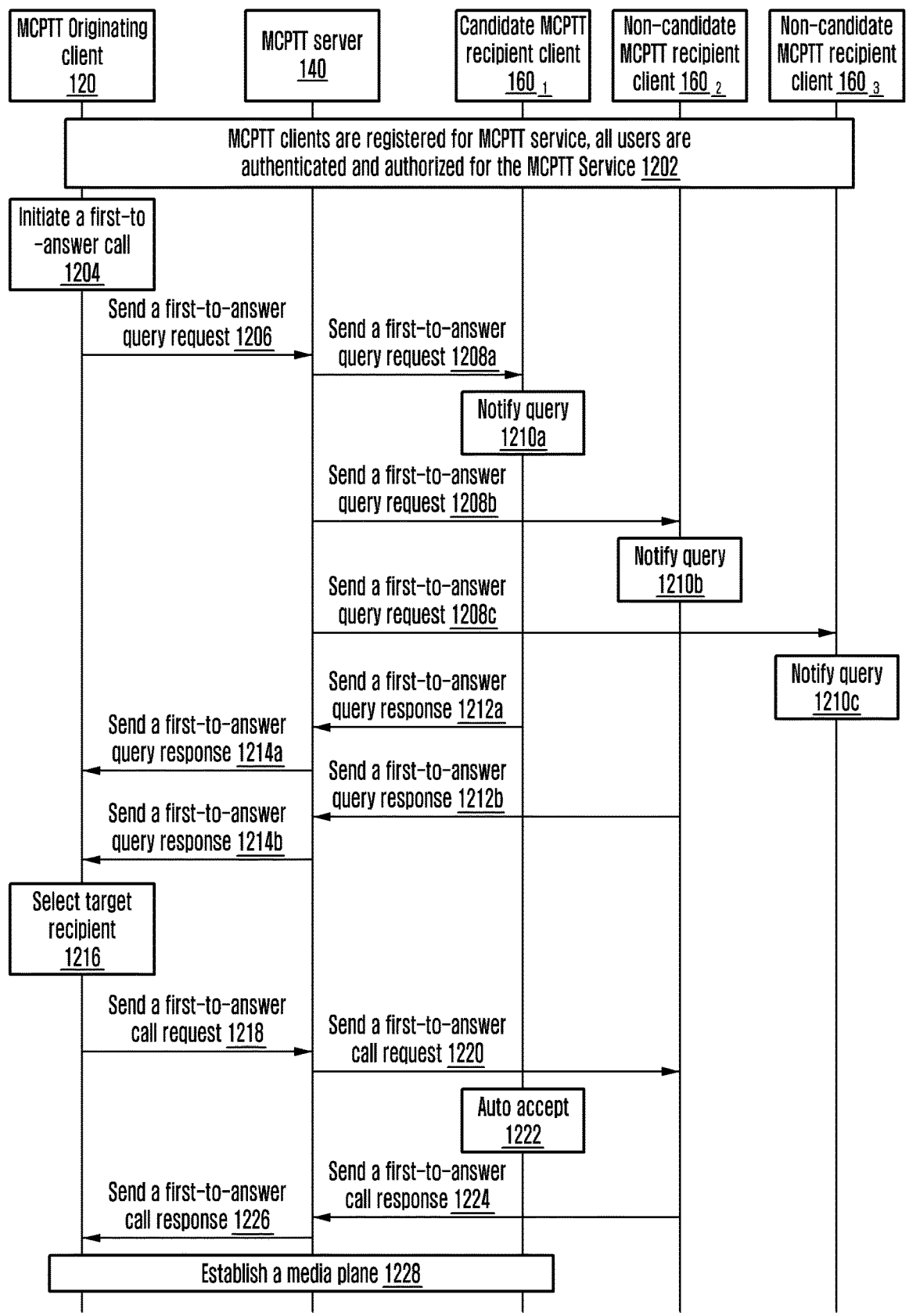
FIG. 12 is a sequence diagram illustrating signaling control plane procedures for a MCPTT originating client initiating establishment of a first-to-answer call with a plurality of MCPTT recipient clients by Query and Invite process, according to an embodiment as disclosed herein.

FIG. 12 is a sequence diagram illustrating signaling control plane procedures for the MCPTT originating client 120 initiating establishment of the first-to-answer private call with the plurality of MCPTT recipient clients 160₁₋₃ by Query and Invite, according to an embodiment as disclosed herein.

Pre-conditions: The calling MCPTT user of the MCPTT originating client 120 has selected the first-to-answer call. The sequence of steps is described below:

At step 1202, the MCPTT clients are registered and their respective users, the MCPTT users, are authenticated and authorized to use the MCPTT service.

At step 1204, the MCPTT user of the MCPTT originating client 120 initiates the first-to-answer call for the plurality of MCPTT recipient clients 160₁₋₃.

At step 1206, the MCPTT originating client 120 sends the first-to-answer query request including the multiple potential target recipients indicated as the URI list, using the MCPTT service identifier as defined in 3GPP TS 23.228 (possible for the SIP core to route the request to the MCPTT server 140). In an embodiment, the first-to-answer query request includes the MCPTT ID of the inviting user. Such query can be carried over a SIP message e.g., SIP MESSAGE, SIP OPTIONS, SIP presence methods.

At steps 1208a, 1208b, 1208c, the MCPTT server 140 confirms that the MCPTT users are authorized for the first-to-answer query and determines the list of MCPTT users to send the query request. Further, the MCPTT server 140 sends the first-to-answer query request to the plurality of MCPTT recipient clients 160₁₋₃.

At steps 1210a, 1210b, and 1210c, each MCPTT user of the plurality of MCPTT recipient clients 160₁₋₃ is alerted with the query. In cases where the automatic answer or the voicemail is configured at the terminating side, such settings are not applied for the incoming first-to-answer query request.

At steps 1212a, 1212b, the MCPTT user of the candidate MCPTT recipient client 160₁ and the MCPTT user of the non-candidate MCPTT recipient client 160₂ have confirmed their availability for the first-to-answer call by sending the first-to-answer query response to the MCPTT server 140.

At steps 1214a, 1214b, the MCPTT server 140 sends the first-to-answer query response to the MCPTT originating client 120 indicating that the MCPTT user of the candidate MCPTT recipient client 160₁ and the MCPTT user of the non-candidate MCPTT recipient client 160₂ are available for receiving the first-to-answer call.

At step 1216, the MCPTT user of the candidate MCPTT recipient client 1601 has to select any of the MCPTT users acknowledging their availability. Consider that the candidate MCPTT recipient client 160₁ is selected for the first-to-answer call.

At step 1218, the MCPTT originating client 120 sends the first-to-answer call request including the selected target recipient, using the MCPTT service identifier as defined in 3GPP TS 23.228 (possible for the SIP core to route the request to the MCPTT server 140). In an embodiment, the first-to-answer call includes the MCPTT ID of the inviting user and the SDP offer containing one or more media types. In another embodiment, the first-to-answer call request includes the data element that indicates that the MCPTT originating client 120 is requesting the floor, for the first-to-answer call with the floor control.

At step 1220, the MCPTT server 140 includes the information that it communicates using the MCPTT service, offers the same media types or the subset of the media types contained in the initial received request and sends the similar first-to-answer call request to the candidate MCPTT recipient client 1601, including the MCPTT ID of the calling MCPTT user. If the MCPTT user has registered to the MCPTT service with multiple MCPTT recipient clients and has designated the MCPTT recipient client for receiving the private calls, then the incoming first-to-answer call request is delivered only to the designated MCPTT recipient client. Otherwise, the first-to-answer call request may be delivered to all the registered MCPTT recipient clients.

At step 1222, the MCPTT user of the candidate MCPTT recipient client 1601 is alerted. In cases where the automatic answer or the voicemail is configured at the terminating side, such settings are not applied for the incoming first-to-answer call request.

At step 1224, the MCPTT user of the candidate MCPTT recipient client 1601 has accepted the call (i.e., has taken some action to accept via the user interface) or automatically since the MCPTT user has already his availability, which causes candidate MCPTT recipient client 160₁ to send the first-to-answer call response to the MCPTT server 140.

At step 1226, the MCPTT server 140 sends the first-to-answer call response to the MCPTT originating client 120 indicating that the MCPTT user of the candidate MCPTT recipient client $160_1$ has accepted the call, including the accepted media parameters.

At step 1228, the media plane for communication is established. Either user can transmit the media individually by using the floor control. For successful call establishment for the first-to-answer call with the floor request from the MCPTT originating client 120, the floor participant associated with the MCPTT originating client 120 is granted the floor initially. At the same time, the floor participant associated with the candidate MCPTT recipient client $160_1$ is informed that the floor is taken. The meaning of the floor request (give floor initially to originator [MCPTT originating client 120], or give floor initially to target [candidate MCPTT recipient client $160_1$]) may be configurable. For the first-to-answer call without the floor control both the users are allowed to transmit simultaneously.

Figure 13:
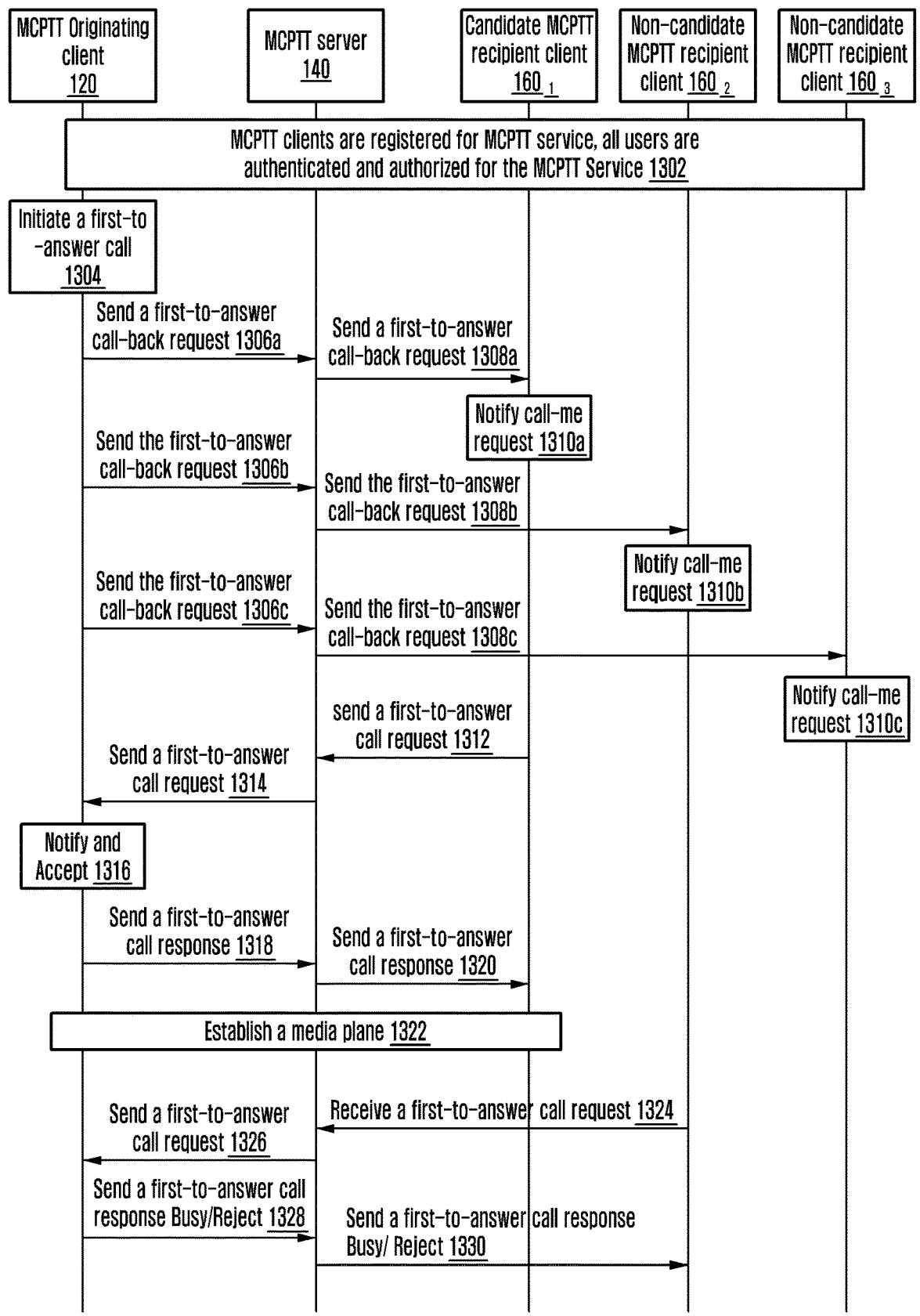
FIG. 13 is a sequence diagram illustrating signaling control plane procedures for a MCPTT originating client initiating establishment of a first-to-answer call with a plurality of MCPTT recipient clients by sending a Call-me Back request, according to an embodiment as disclosed herein.

FIG. 13 is a sequence diagram illustrating signaling control plane procedures for the MCPTT originating client 120 initiating establishment of the first-to-answer call with the plurality of MCPTT recipient clients $160_{1-3}$ by Call-me Back, according to an embodiment as disclosed herein.

Pre-conditions: The calling MCPTT user of the MCPTT originating client 120 has selected the first-to-answer call. The sequence of steps is described below:

At step 1302, the MCPTT clients are registered and their respective users, the MCPTT user are authenticated and authorized to use the MCPTT service.

At step 1304, the MCPTT user of the MCPTT originating client 120 requests selected multiple potential target recipients for placing (or initiating) the call-back request.

At steps 1306a, 1306b, and 1306c, the MCPTT originating client 120 sends the first-to-answer call-back request including the multiple potential target recipients indicated as the URI list, using the MCPTT service identifier as defined in 3GPP TS 23.228 (possible for the SIP core to route the request to the MCPTT server 140). In an embodiment, the first-to-answer call-back request includes the MCPTT ID of inviting user. Such call-back can be carried over the SIP message e.g., SIP MESSAGE methods.

At steps 1308a, 1308b, 1308c, the MCPTT server 140 may confirm that the MCPTT users are authorized for the first-to-answer call-back and determines the list of MCPTT users to send the call-back request. Further, the MCPTT server 140 sends the first-to-answer call-back request to the plurality of MCPTT recipient clients $160_{1-3}$.

At steps 1310a, 1310b, and 1310c, each MCPTT user of the plurality of MCPTT recipient clients $160_{1-3}$ is alerted with the call-back request. In cases where the automatic answer or the voicemail is configured at the terminating side, such settings are not applied for the incoming first-to-answer call-back request. Consider that the MCPTT user of the candidate MCPTT recipient client $160_1$ has decided to call-back.

At step 1312, the candidate MCPTT recipient client $160_1$ sends the first-to-answer call request to the MCPTT client 120, using the MCPTT service identifier as defined in 3GPP TS 23.228 (possible for the SIP core to route the request to the MCPTT server 140). In an embodiment, the first-to-answer call request includes the MCPTT ID of the inviting user and the SDP offer containing one or more media types. In another embodiment, the first-to-answer call request includes the data element that indicates that the candidate MCPTT recipient client 1601 is requesting the floor, for the first-to-answer call with the floor control. The candidate MCPTT recipient client $160_1$ includes the first-to-answer call that indicates that the call is being established in response to call-back request.

At step 1314, the MCPTT server 140 includes the information that it communicates using the MCPTT service, offers the same media types or the subset of the media types contained in the initial received request and sends the first-to-answer call request to the MCPTT originating client 120, including the MCPTT ID of the candidate MCPTT recipient client $160_1$.

At step 1316, the MCPTT user of the MCPTT originating client 120 alerted.

At step 1318, the MCPTT user of the candidate MCPTT recipient client 1601 has accepted the call (i.e., has taken some action to accept via the user interface) or automatically which causes the MCPTT originating client 120 to send the first-to-answer call response to the MCPTT server 140.

At step 1320, the MCPTT server 140 sends the first-to-answer call response to the candidate MCPTT recipient client $160_1$ indicating that the MCPTT user has accepted the call, including the accepted media parameters.

At step 1322, the media plane for communication is established between the MCPTT originating client 120 and the candidate MCPTT recipient client 1601 through the MCPTT server 140. Either user can transmit the media individually by using the floor control. For a successful call establishment for the first-to-answer call with the floor request from the candidate MCPTT recipient client $160_1$, the floor participant associated with the candidate MCPTT recipient client $160_1$ is granted the floor initially. At the same time the floor participant associated with MCPTT originating client 120 is informed that the floor is taken. The meaning of the floor request (give floor initially to the originator [candidate MCPTT recipient client $160_1$], or give floor initially to the target [MCPTT originating client 120]) may be configurable. For the first-to-answer call without the floor control, both the users are allowed to transmit simultaneously.

At steps 1324 to 1330, any subsequent first-to-answer call request, the MCPTT originating client 120 responds with a busy or reject message as shown in the FIG. 13.

In an embodiment, in the above described solutions (i.e., FIGS. 9-13), the following aspects as described below can be applicable:

First-to-answer call configuration: If the MCPTT user requesting the first-to-answer calls should be controlled by the MCPTT system, then a parameter is necessary to be configured by the MCPTT administrator. Such parameter can exist in the MCPTT user profile data as shown below in Table-1 where "Yes" indicates that such parameter in the respective entities (MCPTT originating client 120, MCPTT Server 140, Configuration management server, MCPTT user database):

TABLE 1

| Parameter description | MCPTT originating client | MCPTT Server | Configuration management server | MCPTT user database |
|---|---|---|---|---|
| Authorised to make a first-to-answer call | Yes | Yes | Yes | Yes |

MCPTT users exist in multiple systems: When some of the potential target recipients for the first-to-answer call request belong to a partner MCPTT system, the MCPTT server 140 in primary domain is mainly responsible for forking the first-to-answer call request in partner MCPTT system and handling the first-to-answer call responses. In some cases, e.g., when several potential target recipients belong to same partner MCPTT system, the MCPTT server 140 in partner system may apply filtering of the first-to-answer call responses.

With and without Floor Control: First-to-answer calls in on-network can be with or without floor control. When the first-to-answer call requires use of the floor control then the first-to-answer call request has to include indication that the floor control is used otherwise the floor control is not used in the call. For the private call with the floor control, the floor control is to be established. For the private call without the floor control, both users have the ability to transmit without the floor arbitration.

Automatic modes and Call forwarding to voicemail: Terminating MCPTT system may have settings or configuration to automatically accept the incoming request. For example, the settings can be such that the incoming call is redirected to the voicemail system. However, when the recipient client or the terminating MCPTT system receives the first-to-answer call request such settings may not be applied and the recipient MCPTT user still be notified of the incoming call request or return the first-to-answer call response with the reject or busy indication.

Using pre-established Session: The MCPTT originating client 120 can establish one or more pre-established sessions to the MCPTT server 140 after SIP registration, and prior to initiating the first-to-answer calls. When such pre-established session exists:

a. Outgoing MCPTT call setup for the first-to-answer call can use a pre-established session and for that the MCPTT recipient client uses SIP procedures to establish the call b. Incoming MCPTT call setup for the first-to-answer call can use the pre-established session and for that the MCPTT recipient client is notified of the start of the MCPTT call control using SIP procedures.

Using Multicast/Broadcast: When large number of the potential target recipients for the first-to-answer call request belongs to a broadcast area, the MCPTT server 140 may decide to deliver the first-to-answer call request via MBMS channel. However, the first-to-answer call response is returned to the MCPTT server 140 from the responding MCPTT recipient client via unicast.

Figure 14:
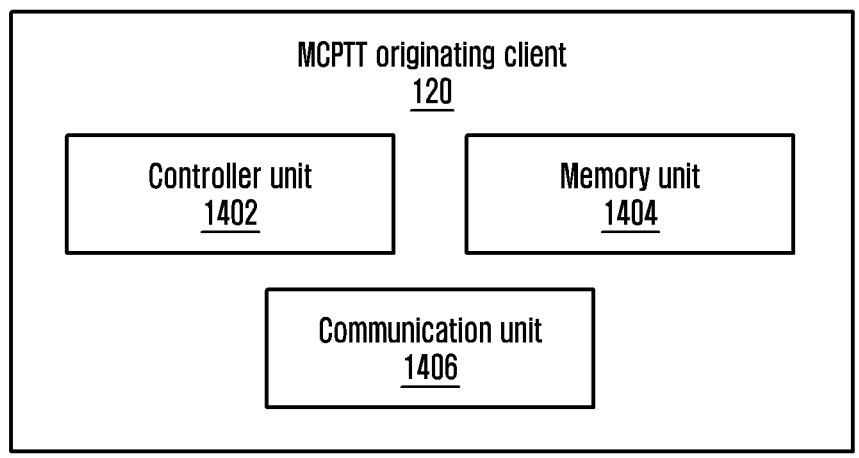
FIG. 14 illustrates a block diagram of a MCPTT originating client, according to an embodiment as disclosed herein.

FIG. 14 illustrates various units of the MCPTT originating client 120, according to an embodiment as disclosed herein. In an embodiment, the MCPTT originating client 120 includes a controller unit 1402, a memory unit 1404, and a communication unit 1406. The functionalities performed by the MCPTT originating client 120 can also be performed by the controller unit 1402 without departing from the scope of the invention.

The memory unit 1404 may include one or more computer-readable storage media. The memory unit 1404 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory unit 1404 may, in some examples, be considered a non-transitory storage medium. The term "non-transitory" may indicate that the storage medium is not embodied in a carrier wave or a propagated signal. However, the term "non-transitory" should not be interpreted to mean that the memory unit 1404 is non-movable. In some examples, the memory unit 1404 can be configured to store larger amounts of information than the memory. In certain examples, a non-transitory storage medium may store data that can, over time, change (e.g., in Random Access Memory (RAM) or cache). The communicator 1406 can be configured for communicating internally between the components and externally with the networks.

The FIG. 14 shows a block diagram of the MCPTT originating client 120 but it is to be understood that other embodiments are not limited thereon. In other embodiments, the MCPTT originating client 120 may include less or more numbers of components. Further, the labels or names of the components are used only for illustrative purpose and does not limit the scope of the invention. One or more components can be combined together to perform same or substantially similar function in the MCPTT originating client 120.

Figure 15:
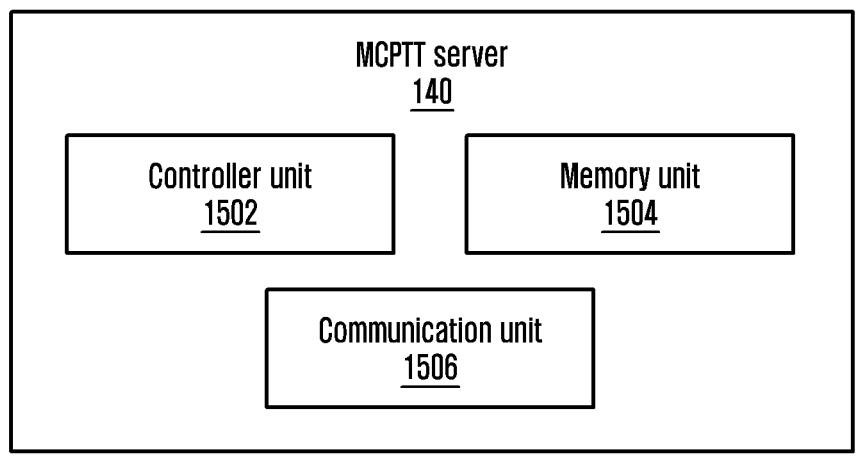
FIG. 15 illustrates a block diagram of a MCPTT server, according to an embodiment as disclosed herein.

FIG. 15 is a block diagram of the MCPTT server 140, according to an embodiment as disclosed herein. In an embodiment, the MCPTT server 140 includes a controller unit 1502, a memory unit 1504, and a communication unit 1506. The functionalities performed by the MCPTT server 140 can also be performed by the controller unit 1502 without departing from the scope of the invention.

The memory unit 1504 may include one or more computer-readable storage media. The memory unit 1504 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory unit 1504 may, in some examples, be considered a non-transitory storage medium. The term "non-transitory" may indicate that the storage medium is not embodied in a carrier wave or a propagated signal. However, the term "non-transitory" should not be interpreted to mean that the memory unit 1504 is non-movable. In some examples, the memory unit 1504 can be configured to store larger amounts of information than the memory. In certain examples, a non-transitory storage medium may store data that can, over time, change (e.g., in Random Access Memory (RAM) or cache). The communicator 1506 can be configured for communicating internally between the components and externally with the networks.

The FIG. 15 shows a block diagram of the MCPTT server 140 but it is to be understood that other embodiments are not limited thereon. In other embodiments, the MCPTT server 140 may include less or more numbers of components. Further, the labels or names of the components are used only for illustrative purpose and does not limit the scope of the invention. One or more components can be combined together to perform same or substantially similar function in the MCPTT server 140.

Figure 16:
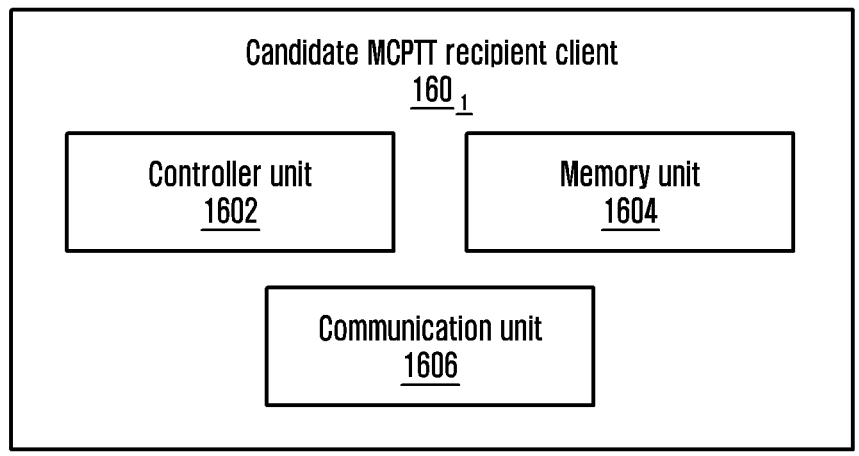
FIG. 16 illustrates a block diagram of a MCPTT recipient client, according to an embodiment as disclosed herein.

FIG. 16 is a block diagram of the candidate MCPTT recipient client 1601, according to an embodiment as disclosed herein. In an embodiment, the candidate MCPTT recipient client 1601 includes a controller unit 160$_2$, a memory unit 1604, and a communication unit 1606. The functionalities performed by the candidate MCPTT recipient client 160$_1$ can also be performed by the controller unit 1602 without departing from the scope of the invention.

The memory unit 1604 may include one or more computer-readable storage media. The memory unit 1604 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory unit 1604 may, in some examples, be considered a non-transitory storage medium. The term "non-transitory" may indicate that the storage medium is not embodied in a carrier wave or a propagated signal. However, the term "non-transitory" should not be interpreted to mean that the memory unit 1604 is non-movable. In some examples, the memory unit 1604 can be configured to store larger amounts of information than the memory. In certain examples, a non-transitory storage medium may store data that can, over time, change (e.g., in Random Access Memory (RAM) or cache). The communicator 1606 can be configured for communicating internally between the components and externally with the networks.

The FIG. 16 shows a block diagram of the candidate MCPTT recipient client $160_1$ but it is to be understood that other embodiments are not limited thereon. In other embodiments, the candidate MCPTT recipient client $160_1$ may include less or more numbers of components. Further, the labels or names of the components are used only for illustrative purpose and does not limit the scope of the invention. One or more components can be combined together to perform same or substantially similar function in the candidate MCPTT recipient client $160_1$.

Figure 17:
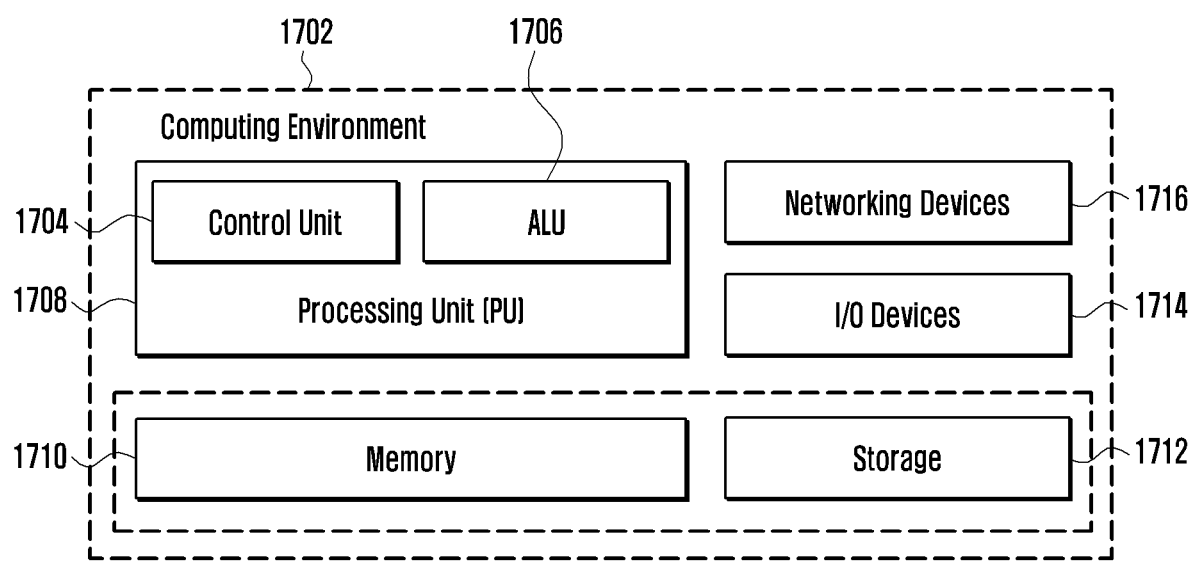
FIG. 17 illustrates a computing environment implementing the system and method for establishing and managing a first-to-answer call in a MCPTT communication, according to an embodiment as disclosed herein.

FIG. 17 illustrates a computing environment 1702 implementing the method and system for managing the first-to-answer call in the MCPTT communication, according to an embodiment as disclosed herein. As depicted in the figure, the computing environment 1702 comprises at least one processing unit 1708 that is equipped with a control unit 1704 and an Arithmetic Logic Unit (ALU) 1706, a memory 1710, a storage unit 1712, plurality of networking devices 1716, and a plurality of input output (I/O) devices 1714. The processing unit 1708 is responsible for processing the instructions of the schemes. The processing unit 1708 receives commands from the control unit 1704 in order to perform its processing. Further, any logical and arithmetic operations involved in the execution of the instructions are computed with the help of the ALU 1706.

The overall computing environment 1702 can be composed of multiple homogeneous or heterogeneous cores, multiple CPUs of different kinds, special media and other accelerators. The processing unit 1708 is responsible for processing the instructions of the schemes. Further, the plurality of processing units 1708 may be located on a single chip or over multiple chips.

The scheme comprising of instructions and codes required for the implementation are stored in either the memory unit 1710 or the storage 1712 or both. At the time of execution, the instructions may be fetched from the corresponding memory 1710 or storage unit 1712, and executed by the processing unit 1708.

In case of any hardware implementations various networking devices 1716 or external I/O devices 1714 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 17 include blocks which can be at least one of a hardware device, or a combination of hardware device and software units.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method performed by a mission critical push to talk (MCPTT) server in a communication system, the method comprising:
   receiving, from an MCPTT originating client, a first MCPTT first-to-answer call request message including an MCPTT identifier of the MCPTT originating client and at least one MCPTT identifier of at least one MCPTT recipient client;
   determining at least one MCPTT user to transmit a second MCPTT first-to-answer call request message based on the at least one MCPTT identifier of the at least one MCPTT recipient client;
   transmitting, to the at least one MCPTT recipient client of the determined at least one MCPTT user, the second MCPTT first-to-answer call request message;
   receiving, from a first MCPTT recipient client among the at least one MCPTT recipient client, a first MCPTT first-to-answer call response message; and
   transmitting, to the MCPTT originating client, a second MCPTT first-to-answer call response message for indicating that an MCPTT user of the first MCPTT recipient client has accepted a call.

2. The method of claim 1, wherein the first MCPTT first-to-answer call request message further includes at least one media parameter associated with a session description protocol (SDP) offer.

3. The method of claim 2, wherein the second MCPTT first-to-answer call request message includes the least one media parameter or a subset of the least one media parameter.

4. The method of claim 3, wherein the second MCPTT first-to-answer call response message includes an accepted media parameter selected from the at least one media parameter.

5. The method of claim 1, further comprising:
   transmitting, to a second MCPTT recipient client among the at least one MCPTT recipient client, an MCPTT first-to-answer call cancel request message.

6. A mission critical push to talk (MCPTT) server in a communication system, the MCPTT server comprising:
   a communication unit; and
   a controller coupled with the communication unit and configured to:
   receive, from an MCPTT originating client, a first MCPTT first-to-answer call request message including an MCPTT identifier of the MCPTT originating client and at least one MCPTT identifier of at least one MCPTT recipient client,
   determine at least one MCPTT user to transmit a second MCPTT first-to-answer call request message based on the at least one MCPTT identifier of the at least one MCPTT recipient client,
   transmit, to the at least one MCPTT recipient client of the determined at least one MCPTT user, the second MCPTT first-to-answer call request message,
   receive, from a first MCPTT recipient client among the at least one MCPTT recipient client, a first MCPTT first-to-answer call response message, and transmit, to the MCPTT originating client, a second MCPTT first-to-answer call response message for indicating that an MCPTT user of the first MCPTT recipient client has accepted a call.

7. The MCPTT server of claim 6, wherein the first MCPTT first-to-answer call request message further includes at least one media parameter associated with a session description protocol (SDP) offer.

8. The MCPTT server of claim 7, wherein the second MCPTT first-to-answer call request message includes the least one media parameter or a subset of the least one media parameter.

9. The MCPTT server of claim 8, wherein the second MCPTT first-to-answer call response message includes an accepted media parameter selected from the at least one media parameter.

10. The MCPTT server of claim 6, wherein the controller is configured to transmit, to a second MCPTT recipient client among the at least one MCPTT recipient client, an MCPTT first-to-answer call cancel request message.

11. A method performed by a terminal for a mission critical push to talk (MCPTT) service in a communication system, the method comprising:
transmitting, to an MCPTT server, an MCPTT first-to-answer call request message including an MCPTT identifier of the terminal and at least one MCPTT identifier of at least one MCPTT recipient client;
receiving, from the MCPTT server, an MCPTT first-to-answer call response message for indicating that an MCPTT user of a first MCPTT recipient client, among at least one MCPTT user determined based on the at least one MCPTT identifier of the at least one MCPTT recipient client, has accepted a call; and
establishing a media plane for communication with the first MCPTT recipient client.

12. The method of claim 11, wherein the MCPTT first-to-answer call request message further includes at least one media parameter associated with a session description protocol (SDP) offer.

13. The method of claim 12, wherein the MCPTT first-to-answer call response message includes an accepted media parameter selected from the at least one media parameter.

14. The method of claim 11, wherein a user of the terminal is authorized for an MCPTT first-to-answer call by the MCPTT server.

15. The method of claim 11, wherein an MCPTT first-to-answer call cancel request message is transmitted to a second MCPTT recipient client among the at least one MCPTT recipient client.

16. A terminal for a mission critical push to talk (MCPTT) service in a communication system, the terminal comprising:
a transceiver; and
a controller coupled with the transceiver and configured to:
transmit, to an MCPTT server, an MCPTT first-to-answer call request message including an MCPTT identifier of the terminal and at least one MCPTT identifier of at least one MCPTT recipient client,
receive, from the MCPTT server, an MCPTT first-to-answer call response message for indicating that an MCPTT user of a first MCPTT recipient client, among at least one MCPTT user determined based on the at least one MCPTT identifier of the at least one MCPTT recipient client, has accepted a call, and
establish a media plane for communication with the first MCPTT recipient client.

17. The terminal of claim 16, wherein the MCPTT first-to-answer call request message further includes at least one media parameter associated with a session description protocol (SDP) offer.

18. The terminal of claim 17, wherein the MCPTT first-to-answer call response message includes an accepted media parameter selected from the at least one media parameter.

19. The terminal of claim 16, wherein a user of the terminal is authorized for an MCPTT first-to-answer call by the MCPTT server.

20. The terminal of claim 16, wherein an MCPTT first-to-answer call cancel request message is transmitted to a second MCPTT recipient client among the at least one MCPTT recipient client.

* * * * *